(12) United States Patent
Thurman

(10) Patent No.: US 9,457,251 B2
(45) Date of Patent: *Oct. 4, 2016

(54) BALL SENSING

(71) Applicant: Wilson Sporting Goods Co., Chicago, IL (US)

(72) Inventor: Robert T. Thurman, Plainfield, IL (US)

(73) Assignee: Wilson Sporting Goods Co., Chicago, IL (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/188,907

(22) Filed: Feb. 25, 2014

(65) Prior Publication Data

US 2014/0277636 A1 Sep. 18, 2014

Related U.S. Application Data

(60) Provisional application No. 61/788,304, filed on Mar. 15, 2013.

(51) Int. Cl.
| | |
|---|---|
| *A63B 71/06* | (2006.01) |
| *A63B 69/00* | (2006.01) |
| *A63B 24/00* | (2006.01) |
| *A63F 13/00* | (2014.01) |
| *G06F 3/00* | (2006.01) |
| *A63B 43/00* | (2006.01) |
| *A63B 43/06* | (2006.01) |
| *A63F 13/812* | (2014.01) |

(52) U.S. Cl.
CPC ....... *A63B 69/0002* (2013.01); *A63B 24/0021* (2013.01); *A63B 43/008* (2013.01); *A63B 43/06* (2013.01); *A63B 71/0605* (2013.01); *A63F 13/005* (2013.01); *A63F 13/812* (2014.09); *G06F 3/002* (2013.01); *A63B 2024/0037* (2013.01); *A63B 2071/0658* (2013.01); *A63B 2071/0663* (2013.01); *A63B 2071/0666* (2013.01); *A63B 2102/18* (2015.10); *A63B 2207/02* (2013.01); *A63B 2220/12* (2013.01); *A63B 2220/40* (2013.01); *A63B 2220/833* (2013.01); *A63B 2225/20* (2013.01); *A63B 2225/50* (2013.01); *A63B 2225/54* (2013.01)

(58) Field of Classification Search
USPC .............................. 700/90, 91; 473/564, 451
See application file for complete search history.

(56) References Cited

U.S. PATENT DOCUMENTS

| | | | |
|---|---|---|---|
| 2,020,484 A | 11/1935 | Turner | 240/6.4 |
| 2,307,362 A | 1/1943 | Dupler | 240/2 |
| 2,849,819 A | 9/1958 | Murphy et al. | 46/230 |
| 2,871,343 A | 1/1959 | Whitney | 240/10 |
| 2,903,820 A | 9/1959 | Bodell | 46/228 |
| 3,011,048 A | 11/1961 | O'Brien | 240/6.4 |
| 3,229,976 A | 1/1966 | Allen, Jr. | 273/58 |
| 3,304,651 A | 2/1967 | Deyerl | 46/228 |
| 3,351,347 A | 11/1967 | Smith et al. | 273/213 |
| 3,458,205 A | 7/1969 | Smith et al. | 273/213 |

(Continued)

*Primary Examiner* — Dmitry Suhol
*Assistant Examiner* — Brandon Gray
(74) *Attorney, Agent, or Firm* — Terence P. O'Brien; Todd A. Rathe

(57) ABSTRACT

A method including the steps of receiving signals indicating movement of a physical ball relative to a strike zone during a pitch, retrieving a batting characteristic of a simulated batter corresponding to the indicated movement of the physical ball relative to the strike zone during the pitch, and displaying on a computing device a simulated pitch result for the pitch based on the retrieved batting characteristic of the simulated batter for the indicated movement.

27 Claims, 11 Drawing Sheets

(56) References Cited

U.S. PATENT DOCUMENTS

| | | | |
|---|---|---|---|
| 3,521,886 A | 7/1970 | Bosco | 273/138 |
| 3,580,575 A | 5/1971 | Speeth | 273/58 |
| 3,610,916 A | 10/1971 | Meehan | 240/6.4 |
| 3,745,677 A | 7/1973 | Moran | 40/126 |
| 3,786,246 A | 1/1974 | Johnson et al. | 240/6.4 |
| 3,804,411 A | 4/1974 | Hendry | 273/58 |
| 3,935,669 A | 2/1976 | Potrzuski et al. | 46/228 |
| 4,002,893 A | 1/1977 | Newcomb et al. | 240/6.4 |
| 4,133,528 A | 1/1979 | Koblick | 273/65 |
| 4,479,649 A | 10/1984 | Newcomb et al. | 273/61 |
| 4,542,445 A | 9/1985 | Marletta | 362/96 |
| 4,563,160 A | 1/1986 | Lee | 446/47 |
| 4,607,850 A | 8/1986 | O'Riley | 273/424 |
| 4,701,146 A | 10/1987 | Swenson | 446/130 |
| 4,776,589 A | 10/1988 | Yang | 273/58 |
| 4,801,141 A | 1/1989 | Rumsey | 273/1 |
| 4,963,117 A | 10/1990 | Gualdoni | 446/219 |
| 4,967,596 A | 11/1990 | Rilling et al. | 73/492 |
| 4,997,403 A | 3/1991 | Akman | 446/220 |
| 5,054,778 A | 10/1991 | Maleyko | 273/58 |
| 5,066,011 A | 11/1991 | Dykstra et al. | 273/58 |
| 5,066,012 A | 11/1991 | Stark | 273/65 |
| 5,071,122 A | 12/1991 | Messina | 273/26 |
| 5,080,359 A | 1/1992 | Thill | 273/60 |
| 5,088,740 A | 2/1992 | Peterson | 273/410 |
| 5,102,131 A | 4/1992 | Remington et al. | 273/58 |
| 5,170,664 A | 12/1992 | Hirsh et al. | 73/493 |
| 5,186,458 A | 2/1993 | Redondo | 273/65 |
| 5,228,686 A | 7/1993 | Maleyko | 273/58 |
| 5,236,383 A | 8/1993 | Connelly | 446/219 |
| 5,242,160 A | 9/1993 | Girard et al. | 273/400 |
| 5,319,531 A | 6/1994 | Kutnyak | 362/184 |
| D349,518 S | 8/1994 | Amram | D21/5 |
| 5,388,825 A | 2/1995 | Myers et al. | 273/58 |
| 5,403,000 A | 4/1995 | Woosley | 273/1.5 |
| 5,564,702 A | 10/1996 | Meffert | 273/153 |
| 5,573,239 A | 11/1996 | Ryker et al. | 273/26 |
| 5,573,240 A | 11/1996 | Humboldt | 273/26 |
| 5,602,638 A | 2/1997 | Boulware | 356/28 |
| 5,609,411 A | 3/1997 | Wang | 362/234 |
| 5,639,076 A | 6/1997 | Cmiel et al. | 473/570 |
| 5,683,316 A | 11/1997 | Campbell | 473/570 |
| 5,725,445 A | 3/1998 | Kennedy et al. | 473/570 |
| 5,730,442 A | 3/1998 | Anderson | 273/400 |
| 5,807,193 A | 9/1998 | Talarico et al. | 473/421 |
| 5,820,484 A | 10/1998 | Terry | 473/356 |
| 5,820,496 A | 10/1998 | Bergeron | 473/455 |
| 5,888,156 A | 3/1999 | Cmiel et al. | 473/570 |
| 5,897,445 A * | 4/1999 | Sanders | 473/421 |
| 5,971,873 A | 10/1999 | Balducci | 473/433 |
| 6,073,086 A | 6/2000 | Marinelli | 702/141 |
| 6,083,124 A | 7/2000 | Williams | 473/421 |
| 6,142,894 A | 11/2000 | Lee | 473/570 |
| 6,148,271 A | 11/2000 | Marinelli | 702/141 |
| 6,151,563 A | 11/2000 | Marinelli | 702/141 |
| 6,157,898 A | 12/2000 | Marinelli | 702/141 |
| 6,173,956 B1 | 1/2001 | O'Neal | 273/410 |
| 6,189,889 B1 | 2/2001 | Yip | 273/348 |
| 6,224,493 B1 | 5/2001 | Lee et al. | 473/223 |
| 6,251,035 B1 | 6/2001 | Fa | 473/570 |
| 6,358,164 B1 | 3/2002 | Bracewell et al. | 473/454 |
| 6,379,272 B1 | 4/2002 | Gorgo et al. | 473/421 |
| 6,425,834 B1 | 7/2002 | Nozato | 473/421 |
| 6,428,432 B1 | 8/2002 | Kachel | 473/570 |
| 6,482,071 B1 | 11/2002 | Wilgosz | 446/486 |
| 6,547,623 B1 | 4/2003 | Collado | 446/47 |
| 6,554,284 B2 | 4/2003 | Chou | 273/371 |
| 6,620,064 B2 | 9/2003 | Nickerson | 473/431 |
| 6,692,367 B1 | 2/2004 | Duran | 472/92 |
| 6,709,351 B2 | 3/2004 | Hori | 473/455 |
| 6,726,580 B2 | 4/2004 | Peterson | 473/570 |
| 6,729,981 B1 | 5/2004 | Clifton | 473/468 |
| 6,746,348 B2 | 6/2004 | Barnes et al. | 473/433 |
| 6,780,130 B1 | 8/2004 | Monochello | 473/570 |
| 6,849,009 B1 | 2/2005 | Forlini | 473/446 |
| 6,926,060 B2 | 8/2005 | Mark | 160/135 |
| 7,014,581 B2 | 3/2006 | Ng | 473/570 |
| 7,021,140 B2 | 4/2006 | Perkins | 73/493 |
| 7,140,248 B1 | 11/2006 | Brundage | 73/492 |
| 7,160,214 B1 | 1/2007 | Rome | 473/454 |
| 7,163,474 B1 | 1/2007 | Skinner et al. | 473/454 |
| 7,175,548 B2 | 2/2007 | McNulty | 473/431 |
| 7,179,181 B2 | 2/2007 | Ko | 473/570 |
| 7,234,351 B2 | 6/2007 | Perkins | 73/493 |
| 7,244,199 B1 | 7/2007 | Romano | 473/478 |
| 7,270,608 B2 | 9/2007 | Cho | 473/197 |
| 7,288,037 B2 | 10/2007 | Myers | 473/613 |
| 7,341,530 B2 | 3/2008 | Cavallaro et al. | 473/455 |
| 7,393,291 B2 | 7/2008 | Huang et al. | 473/456 |
| 7,399,241 B1 | 7/2008 | Thomas, Sr. | 473/455 |
| 7,662,053 B1 | 2/2010 | Summers et al. | 473/431 |
| 7,686,712 B2 | 3/2010 | Sifrit | 473/478 |
| 7,719,469 B2 | 5/2010 | Englert et al. | 342/418 |
| 7,727,097 B2 | 6/2010 | Siegel et al. | 473/577 |
| 7,740,551 B2 | 6/2010 | Nurnberg et al. | 473/570 |
| 7,744,089 B2 | 6/2010 | Huang | 273/400 |
| 7,795,861 B2 | 9/2010 | Englert et al. | 324/207.17 |
| 7,828,296 B2 | 11/2010 | Crawley et al. | 273/396 |
| 7,867,115 B2 | 1/2011 | Zawitz | 473/570 |
| 7,891,666 B2 | 2/2011 | Kuenzler et al. | 273/317 |
| 7,901,305 B2 | 3/2011 | Maeda | 473/436 |
| 7,915,887 B2 | 3/2011 | Englert et al. | 324/207.16 |
| 7,927,253 B2 | 4/2011 | Vincent et al. | 482/9 |
| 7,963,865 B2 | 6/2011 | Rigoli | 473/478 |
| 8,001,838 B2 | 8/2011 | Roberts | 73/488 |
| 8,016,699 B1 | 9/2011 | Swartzendruber | 473/431 |
| 8,036,826 B2 | 10/2011 | MacIntosh et al. | 701/213 |
| 8,057,328 B2 | 11/2011 | Englert | 473/479 |
| 8,070,620 B2 | 12/2011 | Rankin | 473/222 |
| 8,079,925 B2 | 12/2011 | Englert et al. | 473/570 |
| 8,152,658 B2 | 4/2012 | Husband | 473/422 |
| 8,172,722 B2 | 5/2012 | Molyneux et al. | 482/1 |
| 8,221,290 B2 | 7/2012 | Vinvent et al. | 482/8 |
| 8,228,056 B2 | 7/2012 | Bucher | 324/207.16 |
| 8,231,487 B2 | 7/2012 | Nurnberg et al. | 473/570 |
| 8,231,506 B2 | 7/2012 | Molyneux et al. | 482/1 |
| 8,322,725 B2 | 12/2012 | Cho | 273/400 |
| 8,353,791 B2 | 1/2013 | Holthouse et al. | 473/415 |
| 8,376,852 B2 | 2/2013 | Kao | 463/36 |
| 8,388,471 B2 | 3/2013 | Morrow | 473/454 |
| 8,413,990 B2 | 4/2013 | Allshouse et al. | |
| 8,439,773 B2 | 5/2013 | Silagy | 473/447 |
| 8,460,128 B2 | 6/2013 | Elpers | 473/431 |
| 8,460,129 B2 | 6/2013 | Forlini et al. | 473/435 |
| 8,506,430 B2 | 8/2013 | Von Der Gruen et al. | 473/570 |
| 8,517,870 B2 | 8/2013 | Crowley et al. | 473/570 |
| 8,529,382 B2 | 9/2013 | Green et al. | 473/454 |
| 8,535,180 B1 | 9/2013 | Husband | 473/422 |
| 8,562,487 B2 | 10/2013 | Berggren et al. | 482/1 |
| 8,591,356 B2 | 11/2013 | Walker | 473/456 |
| 8,617,008 B2 | 12/2013 | Marty et al. | 473/447 |
| 8,622,832 B2 | 1/2014 | Marty et al. | 463/36 |
| 2002/0123386 A1 | 9/2002 | Perlmutter | 473/223 |
| 2002/0137582 A1 | 9/2002 | Yu | |
| 2003/0224885 A1 | 12/2003 | Leal et al. | 473/570 |
| 2003/0228943 A1 | 12/2003 | Powell | 473/454 |
| 2004/0242351 A1 | 12/2004 | Lu et al. | 473/459 |
| 2005/0288134 A1 | 12/2005 | Smith | 473/570 |
| 2006/0040769 A1 | 2/2006 | McNulty | 473/431 |
| 2006/0211523 A1* | 9/2006 | Sabatino | 473/453 |
| 2007/0021242 A1* | 1/2007 | Krickler | 473/451 |
| 2007/0091084 A1* | 4/2007 | Ueshima et al. | 345/419 |
| 2007/0158913 A1 | 7/2007 | Rigoli | 273/407 |
| 2007/0281811 A1 | 12/2007 | Wang | 473/570 |
| 2008/0088303 A1 | 4/2008 | Englert | 324/226 |
| 2009/0040761 A1 | 2/2009 | Huang et al. | 362/253 |
| 2009/0062033 A1 | 3/2009 | Harada | 473/353 |
| 2009/0191990 A1 | 7/2009 | Smith | 473/570 |
| 2009/0210078 A1 | 8/2009 | Crowley | 700/91 |
| 2010/0035710 A1 | 2/2010 | Smith | 473/570 |
| 2010/0069181 A1 | 3/2010 | Lin | 473/570 |
| 2010/0130315 A1 | 5/2010 | Steidle | 473/570 |
| 2010/0198043 A1 | 8/2010 | Holzer et al. | 600/388 |
| 2011/0119022 A1 | 5/2011 | Kuenzler et al. | 702/145 |

(56) References Cited

U.S. PATENT DOCUMENTS

| | | | |
|---|---|---|---|
| 2011/0269517 A1 | 11/2011 | Englert et al. | 463/7 |
| 2011/0294607 A1 | 12/2011 | Roberts | 473/455 |
| 2012/0029666 A1 | 2/2012 | Crowley et al. | 700/91 |
| 2012/0040785 A1 | 2/2012 | DeSort | 473/570 |
| 2012/0058845 A1 | 3/2012 | Crowley et al. | 473/604 |
| 2012/0071282 A1 | 3/2012 | Smith | 473/570 |
| 2012/0244961 A1 | 9/2012 | Dodds | 473/421 |
| 2012/0277890 A1 | 11/2012 | Han | 700/91 |
| 2012/0278023 A1 | 11/2012 | Han | 702/87 |
| 2013/0068017 A1 | 3/2013 | Perkins et al. | 73/504.02 |
| 2013/0073247 A1 | 3/2013 | Perkins et al. | 702/141 |
| 2013/0073248 A1 | 3/2013 | Perkins et al. | 702/141 |
| 2013/0090750 A1 | 4/2013 | Herrman et al. | 700/92 |
| 2013/0157787 A1 | 6/2013 | Green et al. | 473/455 |
| 2013/0157788 A1 | 6/2013 | Moore | 473/455 |
| 2013/0167290 A1 | 7/2013 | Ben Ezra | 2/425 |
| 2013/0172131 A1 | 7/2013 | Bove, Jr. et al. | 473/480 |
| 2013/0267353 A1 | 10/2013 | Hu | 473/421 |
| 2013/0316772 A1 | 11/2013 | Kong | 463/3 |
| 2014/0018181 A1 | 1/2014 | Blake et al. | 473/277 |
| 2014/0120960 A1 | 5/2014 | Hohteri | 455/466 |
| 2014/0125806 A1 | 5/2014 | Kemppainen et al. | 348/157 |
| 2014/0128182 A1 | 5/2014 | Hohteri | 473/570 |
| 2014/0277634 A1* | 9/2014 | Thurman | A63B 24/0021 700/91 |

* cited by examiner

BALL SENSING

RELATED U.S. APPLICATION DATA

The present invention claims the benefit of the filing date under 35 U.S.C. §119(e) of U.S. Provisional Patent Application Ser. No. 61/788,304, filed on Mar. 15, 2013, which is hereby incorporated by reference in its entirety. The present application is related to co-pending U.S. patent application Ser. No. 14/188,743, Ser. No. 14/188,804, Ser. No. 14/188,849 and Ser. No. 14/188,880 filed on the same day herewith, the full disclosure of which is hereby incorporated by reference.

BACKGROUND OF THE INVENTION

Baseball is known as America's pastime, and is growing in popularity throughout the world. Thousands of children and adults enjoy playing baseball or softball. Pitching the baseball or softball is a critical part of the game. Pitching is a skill that pitchers learn and develop overtime through hours, weeks, months and years of practice. Such practice is often tedious and lacks sufficient feedback to facilitate optimal pitching skill improvement.

SUMMARY OF THE DISCLOSURE

The present disclosure presents an apparatus configured for selectable use with an external electronic device. The apparatus includes a ball having a core, a cover assembly surrounding the core, a sensor and a data output device. The cover assembly includes panels joined by stitching and surrounding the core. The sensor senses motion of the ball. The data output device is carried by the ball and is in communication with the sensor. The data output device is configured to transmit data signals to the external electronic device.

According to a principal aspect of the disclosure, a ball includes a core, at least one layer of yarn surrounding the core, a cover assembly, a sensor, a data output device, and a light emitter. The cover assembly includes panels joined by stitching and surrounding the at least one layer of yarn. The sensor senses the motion of the ball. The data output device is carried by the ball and is in communication with the sensor. The light emitter is coupled to the sensor.

According to another principal aspect of the disclosure, a method including the steps of receiving signals from a sensor carried by a baseball or softball indicating sensed motion of a baseball or softball, and displaying at least one of travel velocity and spin rate of the baseball or softball using the received signals on a portable electronic device.

According to another principal aspect of the disclosure, an apparatus includes a computing device to: receive signals indicating movement of a physical ball relative to a strike zone during a pitch; retrieve a batting characteristic of a simulated batter corresponding to the indicated movement of the physical ball relative to the strike zone during the pitch; and output a simulated pitch result for the pitch based on the retrieved batting characteristic of the simulated batter for the indicated movement.

According to another principal aspect of the disclosure, a pitch monitoring system for use with a portable electronic device having a processor includes a ball, at least one sensor, a data output device and a non-transient computer-readable medium. The ball includes a core and a cover assembly comprising panels joined by stitching and surrounding the core. The sensor senses the movement of the ball. The data output device is in communication with the sensor, wherein the data output device transmits the signals to the portable electronic device. The non-transient computer-readable medium contains code to direct the processor to: receive signals indicating movement of a physical ball relative to a strike zone during a pitch of the ball by a first user; retrieve a batting characteristic of a simulated batter corresponding to the indicated movement of the physical ball relative to the strike zone during the pitch; and output a simulated pitch result for the pitch based on the retrieved batting characteristic of the simulated batter for the indicated movement.

According to another principal aspect of the disclosure, a method including the steps of receiving signals indicating movement of a physical ball relative to a strike zone during a pitch, retrieving a batting characteristic of a simulated batter corresponding to the indicated movement of the physical ball relative to the strike zone during the pitch; and displaying on a computing device a simulated pitch result for the pitch based on the retrieved batting characteristic of the simulated batter for the indicated movement.

DETAILED DESCRIPTION OF THE EXAMPLE EMBODIMENTS

Figure 1:
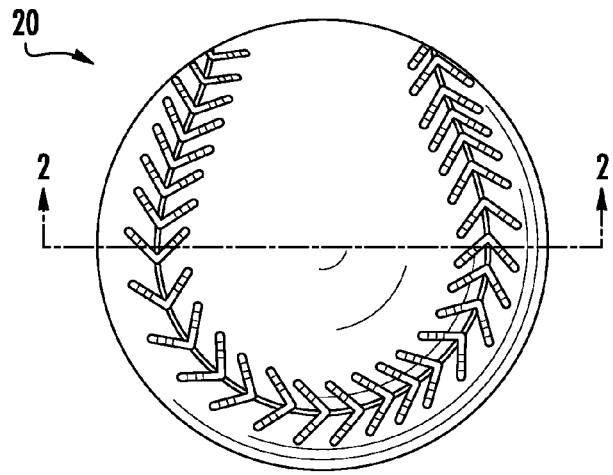
FIG. 1 is a front view of a baseball in accordance with an example implementation of the present invention.
Figure 2:
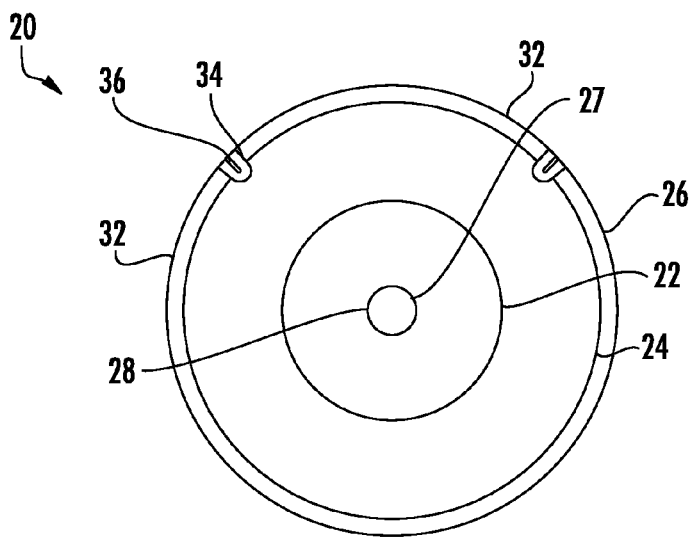
FIG. 2 is a cross-sectional view of the baseball of FIG. 1.

FIGS. 1 and 2 illustrate an example ball 20. Ball 20 comprises a ball associated with sports employing a bat to hit the ball. In one implementation, ball 20 comprises a baseball. In another implementation, ball 20 comprises a softball. In another implementation, ball 20 is a Japanese style rubber baseball (also known as nanshiki). In another implementation, the ball 20 is the ball used for Finnish baseball or Pesäpallo. In some implementations, ball 20 may not necessarily be utilized for hitting or specifically for use with a bat, but may be a practice ball for throwing and pitching in such sports. As will be described hereafter, ball 20 facilitates motion sensing of ball 20 for throw and pitch feedback and enhanced performance.

As shown by FIGS. 1 and 2, ball 20 comprises core 22, at least one layer of yarn 24, cover assembly 26 and electronics 28. Core 22, also referred to as a pill, comprises a sphere forming a center portion of ball 20. In one implementation, core 22 comprises a cork material. In another implementation, core 22 comprises an elastomeric or rubber material. In one implementation, core 22 comprises a cork center portion encased are surrounded by one or more layers of rubber materials. Example of rubber materials include, but are not limited to, non-diene-based rubber materials and diene-based rubber materials such as a polybutadiene rubber. In one implementation, core 22 comprises a sphere formed from polybutadiene rubber having a cis-1, 4 content of greater than 35%. In another implementation, the polybutadiene rubber may have a cis-1,4 content of greater than 90%. In other implementations, the diene-based rubber materials may be an acrylonitrile-butadiene rubber or one or more blends of high-cis polybutadiene rubber and acrylonitrile-butadiene rubber. In yet other embodiments, core 22 may be formed from other materials.

In one implementation, core 22 is formed as a solid, homogeneous, one piece spherical body. In another implementation, core 22 is formed from two or more layers of materials, such as to a more rubber compositions. In some implementations, core 22 may be hollow centrally positioned cavity 27.

The at least one layer of yarn 24 surrounds core 22. Yarn 24 comprise at least one layer single or multiply yarn windings. Such yarn windings may be single ply, five ply, three ply or other numbers of ply values or combinations. The yarn windings may be formed of wool, synthetic yarn, synthetic recycled fibers (such as from used carpet), and fibers or combinations thereof. Synthetic yarn may be formed from polyester, rayon, acrylic, other synthetic materials and combinations thereof. In one implementation, the at least one layer of yarn 24 comprises five ply yarn windings, wherein the yarn can be 85% wool and 15% synthetic fibers. In other implementations, other combinations percentages of wool and synthetic fibers may be employed.

In another implementation, the at least one layer of yarn 24 comprises three yarn layers, wherein the innermost layer comprises a five ply gray colored 85% wool/15% synthetic fiber windings, wherein the outermost yarn layer comprises a three ply, gray colored 85% wool 15% synthetic fiber windings and wherein the intermediate yarn layer comprises a three ply white colored 85% wool 15% synthetic fiber windings. In yet another implementation, the at least one yarn layer 24 comprise a single layer formed of three ply gray colored hundred percent synthetic fiber windings. In still other implementations, other numbers of layers of single or multiply yarn winding layers may be employed. In other implementations, ball 20 can be formed without one or more layers of yarn. In such implementations, the core can be formed of one or more layers of material that are surrounded by the cover assembly without the use of one or more layers of yarn.

Cover assembly 26 comprises one or more panels surrounding the at least one yarn layer 24 and providing an outer cover to ball 20. In the example illustrated, cover assembly 26 comprises two cover panels 32 connected to one another by a stitching 34 along at least one seam 36. Seam 36 is generally flush with the outer diameter ball 20. In other implementations, one seam 36 may be raised slightly raised with respect to central regions of panels 32. The seam 36 may be formed by abutted, overlapped, curved or inverted edges of the cover panels 32. The stitching 34 joining panels 32 along seam 36 is formed from a high tensile strength thread, such as Kevlar thread material. In other implementations, other high tensile strength thread materials may be utilized.

Panels 32 comprise panels formed from a durable high-strength material, such as natural leather. In other implementations, panel 32 may be formed from other durable material such as split leather, synthetic leather, polyurethane, a polyvinyl chloride (PVC), other polymeric materials, or combinations thereof. Although panels 32 are illustrated as each having the same shape, in other implementations, panel 32 may have dissimilar shapes with respect to one another. In other implementations, ball 20 may utilize more than two panels 32.

In one implementation, ball 20, but for electronics 28, may comprise the baseball illustrated and described in US Patent Publication 20130012344 (attached as an exhibit to this disclosure). In one implementation, ball has an initial compression value obtained in accordance with ASTM Standard Test Method F1888-09 and a second compression value obtained in accordance with ASTM Standard Test Method F1888-09 after the baseball has undergone at least 60 impacts of approximately 60 mph against a strike plate, the second compression value being greater than 75% of the initial compression value. In one implementation, core 22 has a diameter of less than 2 inches. In one implementation, ball 20 has a circumference of less than 12.5 inches. In one implementation, ball 20 has a circumference of less than 12 inches. In another implementation, ball 20 has a circumference greater than 9.5 inches, such as a softball. In other implementations, ball 20 has a circumference of less than or equal to 9.5 inches any weight of less than 5.5 ounces, such as a baseball. In other implementations, ball 20, but for electronics 28, may have other configurations.

Electronics 28 are carried by ball 20 and perform one or more functions based upon sensed motion or travel of ball 20. In the example illustrated, electronics 28 are located inwardly of cover panels 32. In the example illustrated, electronics 28 are located inwardly of the at least one layer of yarn 24. In the example illustrated, electronics 28 are located at least partially within core 22. In the specific example illustrated, electronics 28 are located at a center point or centered portion of ball 20 within core 22. In one implementation, electronics 28 are encapsulated within materials of core 22. In another implementation, electronics 28 are located within cavity 27 within core 22. Because electronics 28 are centered within ball 20, electronics 28 are less likely to impact weight distribution characteristics and the feel of ball 20.

In other implementations, electronics 28 may located at other locations, such as: in an un-centered, eccentric position within core 22; in a cavity or depression extending from an exterior surface of core 22 into core 22; centrally located within the one or more windings of the one or more of layers of yarn 24; in a cavity or depression extending from an exterior surface of the at least one layer of yarn 24 into the at least one layer of yarn 24; and/or in a cavity or void formed between core 22 and yarn layer(s) 24 are between yarn layer(s) 24 and cover panels 32.

Figure 3A:
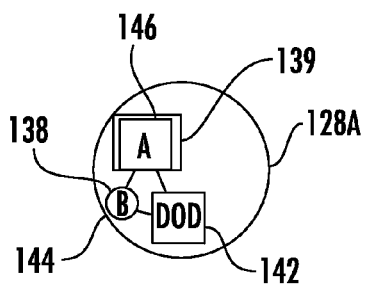
FIG. 3A is a schematic diagram of example implementation of electronics carried by the ball of FIG. 1.

FIG. 3A illustrates electronics 128A, one example of electronics 28 shown in FIG. 2. Electronics 128A are carried by ball 20 and perform one or more functions based upon sensed motion or travel of ball 20. Electronics 128A comprise a battery 138, motion sensor 139 and data output device 142. Although the components of electronics 128 are illustrated as being housed or contained within a spherical body 144, in other implementations, the components of electronics 128A may be supported or contained in other manners, such as along a substrate or circuit chip or the like.

Battery 138 comprises a power storage device to store power for use by sensor 140 and data output device 142. In one implementation, battery 138 comprises a one use battery. In another implementation, battery 138 comprises a rechargeable battery. For example, in one implementation, battery 138 is rechargeable in a wired fashion through a plug or port in ball 20. In another implementation, battery 138 is rechargeable in a noncontact fashion. One implementation, battery 138 may be inductively charged or recharged. In one implementation, ball 20 is alternatively configured to provide access to battery 138 for removal and replacement of battery 138.

Motion sensor 139 comprises one or more sensors to sense motion of ball 20 facilitating a determination of a speed, travel velocity or linear velocity of ball 20. Motion sensor 139 facilitates feedback regarding the speed of ball 20. Motion sensor 139 provides raw sensed motion data in the form of sensed acceleration along different axes. For purposes of this disclosure, the term "raw sensed motion data" comprises data or signals directly outputted or determined by sensor 140. For purposes of this disclosure, the term "sensed motion data" or "motion data" encompasses at least one of raw sensed motion data and data that has been generated based upon or using the raw sensed motion data, such as data that has been derived from the raw sensed motion data. By sensing parameters from which the travel speed of ball 20 may be identified or determined, ball 20 provides feedback for evaluation of a thrown ball or pitch. In one implementation, motion sensor 139 comprises one or more accelerometers 146 which provide acceleration signals or data from which the speed of ball 20 is determined. By allowing the speed of ball 20 to be determined, sensor 140 facilitates evaluation of a pitch, such as a fastball pitch and a changeup pitch. For example, at higher speeds, a changeup pitch should desirably be about 8 to 15 mph slower than the same pitcher's fastball.

Data output device 142 comprises one or more devices to externally communicate the motion information or motion data sensed by sensor 140. In one implementation, data output device 142 comprises a device to wirelessly transmit signals representing the sensed motion information. For example, in one implementation, data output device 142 comprises a Bluetooth device. In another implementation, data output device 142 comprises a Wi-Fi or other radiofrequency transmitter. In another implementation, data output device 142 comprises an active read/write RFID tag which is written upon with data sensed by sensor 140, wherein device 142 actively transmits signals from the tag. In yet another implementation, data output device 142 comprises a passive read/write RFID tag which is written upon with data sent by sensor 140, wherein device 142 is passively read by an external radiofrequency device reader. In another implementation, data output device 142 comprises an infrared or other optical communication device. In yet other implementations, data output device 142 may comprise other devices that communicate the sensed motion data to recipients external to ball 20 in a wireless fashion.

In one implementation, ball 20 communicates the sensed motion data to recipient(s) external to ball 20 in a wireless fashion, wherein the external recipient comprises a portable electronic device such as a smart phone, a flash memory reader (IPOD), a cell phone, a personal data assistant, a laptop computer, a tablet or netbook computer and the like. In one implementation, electronics 128A carries out at least some data modifications and/or analysis prior to the data being externally transmitted to the portable electronic device. For example, electronics 128A may carry out some analysis, data derivations or data compression on the sensed motion information or on derived results of the sensed motion information prior to transmitting the modified, derived and/or compressed data to the portable electronic device. In other implementations, electronics 128A may transmit, in real time, raw signal data or raw sensed motion data directly from sensor 140 to the portable electronic device, wherein the portable electronic device performs analysis or further data derivation using the raw sensed motion data. In such an implementation, because the processing power is more greatly provided by the portable electronic device, rather than electronics 128A of ball 20, the cost of ball 20 may be kept low.

As will be described hereafter with respect to other figures, in some implementations, data output device 142 may additionally or alternatively communicate the sensed motion data in other fashions. For example, in one implementation, data output device 142 comprises a plug-in or port by which the sensed motion data may be communicated externally from ball 20 in a wired fashion. In another implementation, data output device 142 may additionally or alternatively include one or more output mechanisms carried by ball 20 for visually and/or audibly communicating information to a person. For example, in one implementation, data output device 142 comprises a visual display, such as a digital or light emitting diode (LED) display visibly presenting sensed motion information. In another implementation, data output device 142 comprises a speaker for producing audible signals communicating the sensed motion information. In yet another implementation, data output device 142 comprises a light emitter that emits light that is visible on ball 20, wherein the light being emitted changes in response to or based upon the sensed motion information.

Figure 3B:
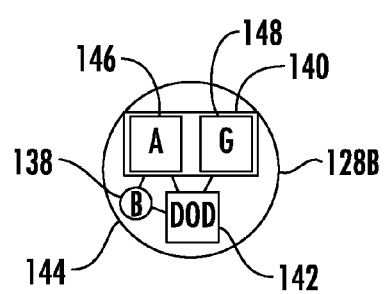
FIG. 3B is a schematic diagram of another example implementation of electronics carried by the ball of FIG. 1.

FIG. 3B illustrates electronics 128B, another implementation of electronics 28 in ball 20. Electronics 128B is similar to electronics 128A except that electronics 128B comprises sensor 140 in lieu of sensor 139. Sensor 140 is similar to sensor 139 except that sensor 140 is additionally configured to sense or detect a spin axis about which ball 20 is spinning or rotating and a rate at which ball 20 is spinning or rotating about the spin axis. As a result, in addition to being able to detect parameters from which linear velocity of ball 20 may be determined, sensor 140 also detects parameters or values indicating angular velocity and acceleration which are indicative of "action" or ball movement of a pitch.

By detecting the spin axis as well as a spin rate, or parameters corresponding to the spin axis and spin rate, sensor 140 provides feedback for evaluation of different throws or pitches. Because sensor 140 provide signals indicating a spin axis of a particular pitch or throw, sensor 140 enables controller 256 (FIG. 6) to identify or determine what type of pitch is being thrown. The sensor 140 can also be configured to identify the angle of the spin axis with respect to a reference, such as the ground or polar axes. Different types of pitches, such as four and two seam (a.k.a. sinker) fastballs, cutter (cut fastball), splitter (split finger fastball), forkball, curveball, slider, sinker, a slider, slurve, screwball, changeup, palm-ball and circle changeup pitches, may have different signature characteristic spin axes or ranges of spin axes. For example, a curveball pitch may have an ideal range of angles for its spin axis and an ideal range of spin rates that is different than the ideal range of angles and spin rates for other types of pitches such as four and two seam (a.k.a. sinker) fastballs, cutter (cut fastball), splitter (split finger fastball), forkball, curveball, slider, sinker, a slider, slurve, screwball, changeup, palm-ball and circle changeup pitches. In such a manner, controller 256 may track the number of each type of pitch being thrown during a session as well as provide feedback for individual pitches based upon the determined type of pitch. Alternatively, sensor 140 provides signals to controller 256 such that data may be outputted to allow a person to better evaluate whether a particular intended type of pitch has an appropriate spin axis or spin rate, and/or whether adjustment should be made to achieve the ideal spin axis or spin rate. For example, the pitcher may be intending to throw a first type of pitch, wherein feedback from sensor 140 may indicate that the throw does not have an appropriate spin axis and/or spin rate for the intended first type of pitch.

Although sensor 140 is illustrated as comprising one or more accelerometers 146 and one or more angular rate gyros or gyrometers 148, in other implementations, sensor 140 may additionally or alternatively comprise a temperature sensor, a pressure sensor and/or a magnetometer. In some implementations, sensor 140 may additionally or alternatively comprise a global positioning system (GPS) antenna or sensor.

Figure 4:
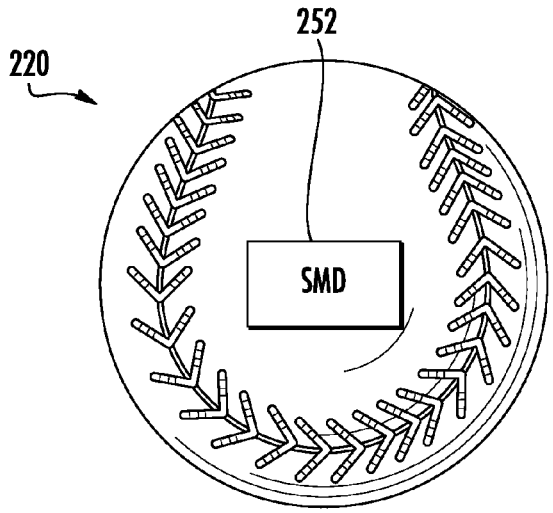
FIG. 4 is a front view of a baseball in accordance with an another example implementation of the present invention.
Figure 5:
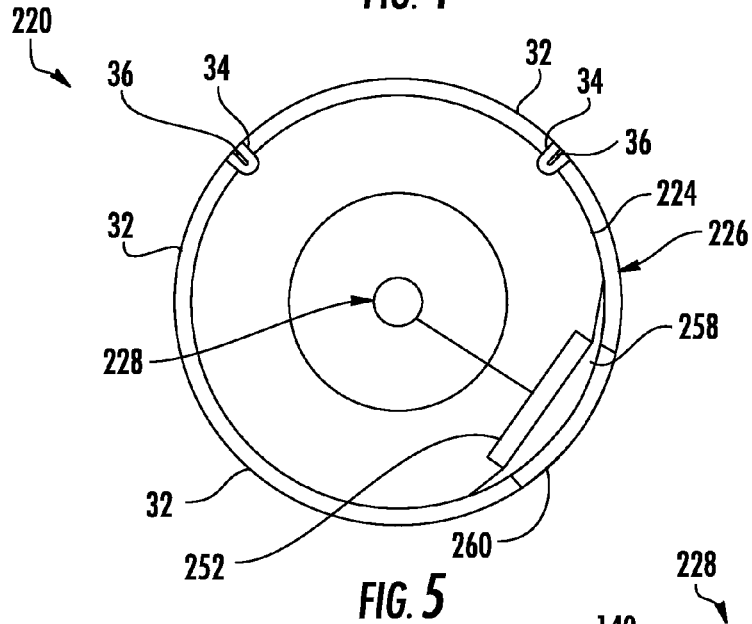
FIG. 5 is a cross-sectional view of the baseball of FIG. 4.
Figure 6:
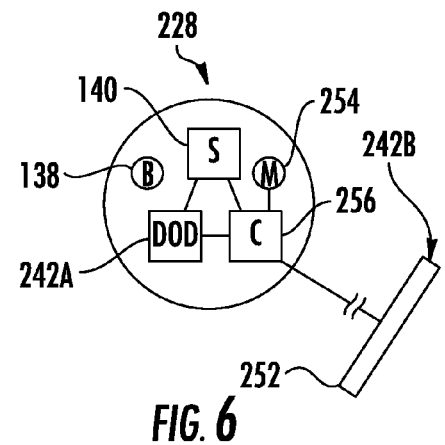
FIG. 6 is a schematic diagram of example implementation of electronics carried by the ball of FIG. 4.

FIGS. 4-6 illustrate ball 220, an example implementation of ball 20. Ball 220 is similar to ball 20 except that ball 220 is specifically illustrated as comprising electronics 228 in lieu of electronics 28 and as further comprising at least one layer 224 of yarn or yarn windings and cover assembly 226 in lieu of layer 24 and cover assembly 26, respectively. Those remaining components of ball 220 which correspond to ball 20 are numbered similarly.

Electronics 228 are similar to electronics 128 (shown in FIG. 3) except that electronics 228 specifically comprises data output devices 242A and 242B. Like electronics 128B, electronics 228 comprise a battery 138 and sensor 140. Data output device 242A comprises a device configured to externally communicate sensed motion data in a wireless fashion to one or more external electronic devices, such as portable electronic devices. For example, in one implementation, data output device 242A comprises a Bluetooth device. In another implementation, data output device 242A comprises a Wi-Fi or other radiofrequency transmitter. In another implementation, data output device 242A comprises an active read/write RFID tag which is written upon with data sensed by sensor 140, wherein device 242A actively transmits signals from the tag. In yet another implementation, data output device 242A comprises a passive read/write RFID tag which is written upon with data sent by sensor 140, wherein device 242A is passively read by an external radiofrequency device reader. In yet other implementations, data output device 242A may comprise other devices that communicate the sensed motion data to recipients external to ball 220 in a wireless fashion. In some implementations, data output device 242A may be omitted, wherein sensed motion data is transmitted solely by data output device 242B.

Data output device 242B comprises display 252, memory 254 and controller 256. Display 252 comprises a display screen, display panel or the like facing outward from ball 222 display sensed motion information to a person viewing ball 220. In one implementation, display 252 may comprise a LED screen. In another implementation, display 252 may comprise an organic light emitting diode (OLED) screen. In still other implementations, display 252 may comprise other display screen technologies. The display 252 either within the ball (FIG. 5) or remote of the ball (FIG. 6) can display data such as velocity, acceleration, spin, spin rate, and other ball motion data, other information, instructions, training tips, words of encouragement or other motivation information, comparison to other players or celebrities, and combinations thereof.

Memory 254 comprises one or more non-transient computer-readable medium or persistent storage devices carried within ball 220 and accessed for reading and/or writing by controller 256 and data output device 242A. In one implementation, memory 254 includes computer-readable instructions or code for directing the operation of controller 256. In one implementation, memory 254 additionally or alternatively stores sensed motion data. The sensed motion data stored by memory 254 comprises both the raw sensed motion data and sensed motion data that has been derived from the raw sensed motion data. The storage of such data may be permanent, until controller 256 group receives a command delete such stored data, or may be temporary, merely held in memory 254 until a pitch has been completed and until the sensed motion data has been displayed on display 252.

Controller 256 comprises one or more processing units or application-specific integrated circuits (ASICs) configured to drive the display of sensed motion data on display 252. In one implementation, controller 256 displays sensed motion data on display 252 for a predetermined period of time following a determination by controller 256 that a pitch or throw has been completed based upon signals or data from sensor 140 indicating travel or motion of the ball 20 has stopped. In one implementation, the predetermined period of time is customizable, being established by controller 256 in response to receiving time periods selections or commands received in a wireless fashion through data output device 242A (serving as a transceiver). In another implementation, controller 256 displays sensed motion data on display 252 in response to manual or audible input of selections or commands. For example, in one implementation, display 252 may comprise a touch screen facilitating manual input of desired settings for the display of sensed motion data. In another implementation, ball 220 may include a microphone receiving voice commands for the display of sensed motion data.

The at least one layer 224 is similar to the at least one layer 24 of yarn or yarn windings except that at least portions 258 of layer 224 opposite to display 252 between screen 252 and the exterior of ball 220 are translucent or transparent, permitting information presented on display 252 to be viewed through the exterior of ball 220. In another implementation, layer 224 may alternatively be recessed or thinner in regions of display 252 such that layer 224 does not extend between display 252 and cover assembly 226 opposite to display 252 such that portion 258 is a void or comprises a void filled with a different translucent or transparent filler material. The display 252 can be curved and arcuate to conform to the shape of ball 220. The display 252 can be positioned: directly inside the cover assembly 226; beneath a thin layer of portion 258 within the at least one layer 224; on an inner surface of cover assembly 226; within cover assembly, but not on the outer surface of the cover assembly 226; or on the outer surface of the cover assembly 226.

Cover assembly 226 is similar to cover assembly 26 except that at least portions of at least one of panels 32 is configured to allow viewing of display panel 252. In one implementation, panel 32 comprises a translucent or transparent portion 260, permitting viewing of display 252 through transparent or translucent portion 260 (and through translucent or transparent portion 258 if desired). Because display panel 252 is located within ball 220, below or inward of cover panel 32, the overall surface area of ball 220 against which a person may grip ball 220 is maintained. Additionally, because the surface area of ball 220 is maintained, the flight characteristics or aerodynamic characteristics of ball 220 are the same or substantially the same as that of a conventional baseball or softball. In another implementation, portion 260 is part of a flap or door that is movable between an open position, permitting viewing of display 252 and a closed position. In other implementations, portion 260 alternatively comprises an opening within panel 32, where the opening forms a void directly exposing display 252 or an opening that is filled with a different translucent or transparent material that extends over display 252. In another implementation, the material used to form portion 260 is the same material used to form panels 32 such that portion 260 is only defined as the portion of the material that overlies display 252.

Figure 7:
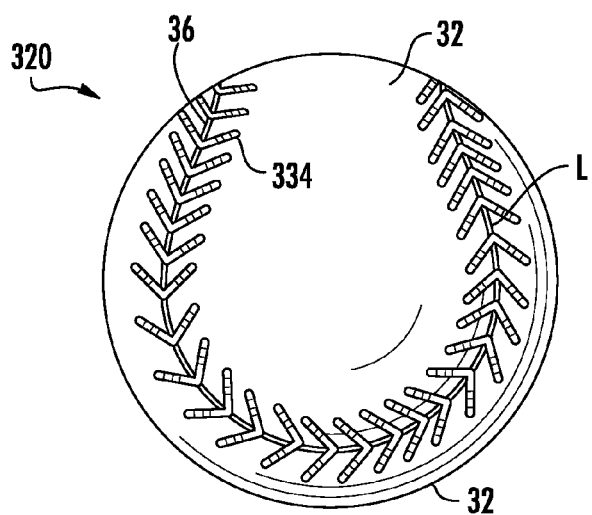
FIG. 7 is a front view of a baseball in accordance with an another example implementation of the present invention.
Figure 8:
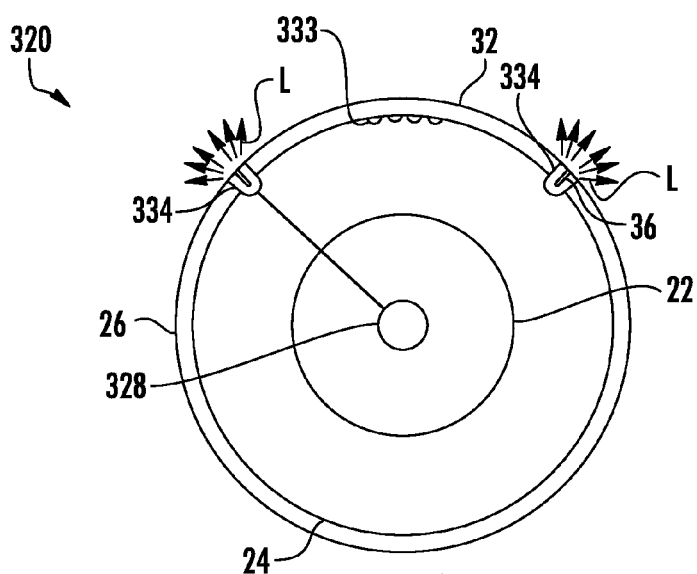
FIG. 8 is a cross-sectional view of the baseball of FIG. 7.
Figure 9:
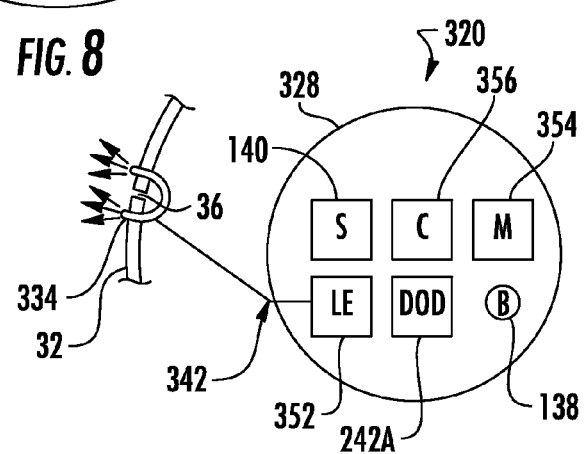
FIG. 9 is a schematic diagram of example implementation of electronics carried by the ball of FIG. 7.

FIGS. 7-9 illustrate ball 320, another implementation of ball 20. Ball 320 is similar to ball 20 except that ball 320 specifically comprises electronics 328 in lieu of electronics 28 and specifically comprises stitching 334 in lieu of stitching 34. Those remaining components of ball 320 which correspond to components of ball 20 are numbered similarly.

FIG. 9 schematically illustrates electronics 328. Electronics 328 are similar to electronics 128 (shown in FIG. 3) except that electronics 328 specifically comprise data output device 242A (described above) and data output device 342 in lieu of data output device 142. Data output device 342 externally communicates sensed motion data by externally emitting visible light and changing one or more characteristics of the visible light based upon sensed motion data to indicate the sensed motion data.

In the example illustrated, data output device 342 comprises light emitter 352, memory 354 and controller 356. Light emitter 352 comprises a controllable or adjustable source of visible light L that is transmitted external of ball 320. In one implementation, light emitter 352 comprises one or more light emitting elements directly on a surface of ball 220. In another implementation, light emitter 352 comprises one or more light emitting elements, such as light emitting diodes 333, that transmit light along or through one or more transparent or translucent structures to external points of ball 220.

In the example illustrated, stitching 334 is formed from one or more translucent or transparent materials, allowing light to pass there through. In one implementation, stitching 334 is formed, at least in part, from material and configured to function as a light pipe, optically conducting or transmitting light from light emitter 352 along and within the light pipe functioning lines, ropes, threads, fibers, strings of material, wherein light is diffused or leaked through sides of the line pipe functioning lines where the light is visible along the surfaces of stitching 334. In one implementation, stitching 334 may comprise acrylic material. In other implementations, stitching 334 may comprise other light transmitting light pipe materials. In other implementations, light from light emitter 352 may be made externally visible in other fashions, such as by making portions of cover assembly 26, layer 24 and/or core 22 translucent or transparent.

Memory 354 comprises one or more non-transient computer-readable mediums or persistent storage devices carried within ball 320 and accessed for reading and/or writing by controller 356 and data output device 242A. In one implementation, memory 354 includes computer-readable instructions or code for directing the operation of controller 356. In one implementation, memory 354 additionally or alternatively stores sensed motion data. The sensed motion data stored by memory 354 comprises both the raw sensed motion data and sensed motion data that has been derived from the raw sensed motion data. The storage of such data may be permanent, until controller 356 receives a command to delete such stored data, or may be temporary, merely held in memory 354 until a pitch has been completed and until the sensed motion data has been communicated by data output device 242A and/or data output device 342.

Controller 356 comprises one or more processing units or application-specific integrated circuits (ASICs) configured to drive the communication of sensed motion data using display output device 342 and, more specifically, using light emitter 352. In one implementation, controller 356 communicates sensed motion data using light emitter 352 for a predetermined period of time following a determination by controller 356 that a pitch or throw has been completed based upon signals or data from sensor 140 indicating travel or motion of the ball 320 has stopped. In one implementation, the predetermined period of time is customizable, being established by controller 356 in response to receiving time periods selections or commands received in a wireless fashion through data output device 242A (serving as a transceiver).

Because sensor 140 provides signals indicating a spin axis and/or spin rate of a particular pitch or throw, sensor 140 enables controller 356 to identify or determine what type of pitch is being thrown. Different types of pitches, such as four and two seam (a.k.a. sinker) fastballs, cutter (cut fastball), splitter (split finger fastball), forkball, curveball, slider, sinker, a slider, slurve, screwball, changeup, palm-ball and circle changeup pitches, may have different signature characteristic spin axes and/or spin rates. As a result, in one implementation, controller 356 determines the type of pitch being thrown based upon the determined spin axis and/or spin rate. Based upon the determined type of pitch being thrown, controller 356 identifies which of a plurality of thresholds are to be utilized to determine whether one or more lighting characteristics of light emitter 352 are to be adjusted. For example, if the sensed spin axis is within a predetermined range assigned to a first type of pitch, such as a curveball, controller 356 may utilize a first threshold for spin rate or a first threshold for velocity when determining whether illumination characteristics of light emitter 352 should be changed based upon the sensed spin rate or velocity. Alternatively, if the sensed spin axis is within a predefined range assigned to a second different type of pitch, such as a slider, controller 356 may utilize a second different threshold for spin rate or a second different threshold for velocity when determining whether to adjust the illumination characteristics of light emitter 352 based upon the sensed spin rate or velocity. Consequently, the feedback and evaluation provided by ball 220 is automatically pitch type specific.

In one implementation, controller 356 generates control signals causing light emitter 352 to turn on and emit light in response to signals from motion sensor 140 indicating motion of ball 320 satisfying a predefined criteria or threshold. For example, in one implementation, controller 356 generates control signals causing light emitter 352 to begin to emit light during a throw or pitch when ball 320 satisfies a predefined minimum velocity, spin rate or spin axis or has a velocity, spin rate or spin axis that falls within a predefined range.

In one implementation, controller 356 adjusts the non-zero emission of light by light emitter 352 dependent upon signals from motion sensor 140. For example, controller 356 may generate control signals causing light emitter 352 to increase an intensity of light being emitted as the rate of spin increases or decreases. This light intensity adjustment may be made in a continuous ramped fashion or may be made in a stepwise fashion as predefined thresholds are satisfied.

In yet another implementation, controller 356 adjusts the frequency or duration of pulses of light emitted by light emitter 352 dependent upon the sensed motion of ball 320. For example, controller 356 may generate control signals causing light emitter 352 to emit light pulses having a frequency or duration upon a predefined minimum spin rate, a predefined velocity or a predefined spin axis being detected.

In one implementation, controller 356 generates control signals adjusting both the pulse frequency/duration and the light brightness or intensity to indicate different detected characteristics. For example, in one implementation, controller 356 may adjust or control the frequency/duration of the pulses based upon spin rate and the brightness or intensity of such pulses based upon a detected velocity or spin axis of ball 320. In other implementations, controller 356 may adjust or control the frequency/duration of pulses based upon the detected path or velocity of ball 320 and the brightness or intensity of such pulses based upon a spin rate of ball 320.

In yet another implementation, controller 334 generates control signals controlling a color of light being emitted by light emitter 352 based upon detected motion of ball 20. For example, controller 356 may cause light emitter 352 to emit a first color of light upon a predefined threshold for spin rate being satisfied and may cause light emitter 352 to emit different colors of light as different spin rate thresholds are satisfied. Similarly, in another implementation, controller 356 may cause light emitter 352 to emit a first color of light upon a predefined threshold or range for velocity being satisfied and may cause light emitter 352 to emit different colors of light as different velocity thresholds or ranges are satisfied. In some implementations, each of light intensity/brightness, pulse duration/frequency and light color may be controlled and adjusted to indicate when each of different predefined motion thresholds (velocity, spin rate, spin axis) are being satisfied.

In some implementations, controller 356 may adjust lighting characteristics of ball 320 based upon a comparison of detected motion or travel of ball 320 (as determined using signals from motion sensor 140) with stored or obtained ball travel results achieved by a celebrity. For purposes of this disclosure, a "celebrity" shall mean a person who has attained notoriety for his or her performance in the sport. Examples of such celebrities include college and professional basketball players. Although controller 356 may utilize memory 354 serving as a celebrity storage for storing user data pertaining to travel of the ball, in other implementations, controller 356 may obtain celebrity ball travel characteristics or results from a remote location using data output device 242A, serving as a transceiver. For example, celebrity ball travel results or characteristics may be alternatively provided at a remote server which may be accessed across a local or wide area network.

Based upon signals received from sensor 140, controller 356 compares a person's results with that of a celebrity and adjusts the lighting characteristics of ball 320 accordingly. For example, in one implementation, controller 356 may compare detected parameters or characteristics of a velocity, spin rate or spin axis with a celebrity's throw or pitch of ball 320. For example, controller 356 may compare of one or more attributes of user's pitch with one or more attributes of the same pitch by a popular softball or baseball celebrity such a major league baseball player. In some implementations, controller 356 may compare user's pitch with statistical characteristics of the same pitch attribute for an aggregate of players, such as players belonging to a particular league. For example, controller 356 may compare a user's spin rate for a pitch with an average spin rate for the same pitch by Little League pitchers, minor-league pitchers, major-league pitchers and All-Star major-league pitchers. Similar comparisons may be made for other sensed motion data such as velocity and spin axis, or combinations of two or more of velocity, spin rate or spin axis. Based upon this comparison, controller 356 generates control signals causing one or more lighting characteristics of ball 320 to be adjusted. For example, if a particular pitch by user has characteristics that satisfy predefined thresholds typical of a minor league baseball pitcher, controller 356 may change the color of light being emitted by ball 320 during the pitch and/or for a predetermined period of time following the pitch, providing a user with a reward or complement and encouragement. In such an implementation, controller 352 and the light being emitted by ball 320 provide a user with a motivational tool by allowing the user to visually determine or see how his or her individual pitch attributes compare to the same individual pitch attributes of a celebrity having above-average skills in the sport.

In some implementations, controller 356 stores and keeps track of results, wherein controller 352 adjusts lighting characteristics of ball 320 as different predetermined thresholds or milestones are met. For example, in one implementation, controller 352 tracks average pitch velocity, wherein controller 352 generates different control signals causing ball 320 to emit a different characteristic light (such as a different color, frequency, brightness etc.) based upon the current average pitch velocity for the player. For example, when a pitcher achieves an average pitch velocity of 40 mph, controller 352 generates control signals causing a first color light to be emitted by ball 320 and when the player achieves a second greater average pitch velocity of say, at least, 60 mph, controller 356 generates control signals causing a second different color light to be emitted by ball 320. If a player's average pitch velocity falls below a predefined threshold, controller 352 generates control signals once again changing the color of light emitted by ball 320. In such an implementation, the color, pulse frequency, brightness etc. of ball 320 provides the player with an instantaneous, visual motivational tool. In some implementations, the visible color may further indicate to others, such as a player's coach, the current average pitch velocity, offering additional opportunities for encouragement. In addition to tracking pitch velocity, controller 352 may be configured to track and adjust lighting characteristics based upon other statistics such as average spin rate and an average spin axis. In lieu of tracking and compare against averages, controller 352 may utilize other statistical values such as variability, maximum, minimum, mean and mode.

Figure 10:
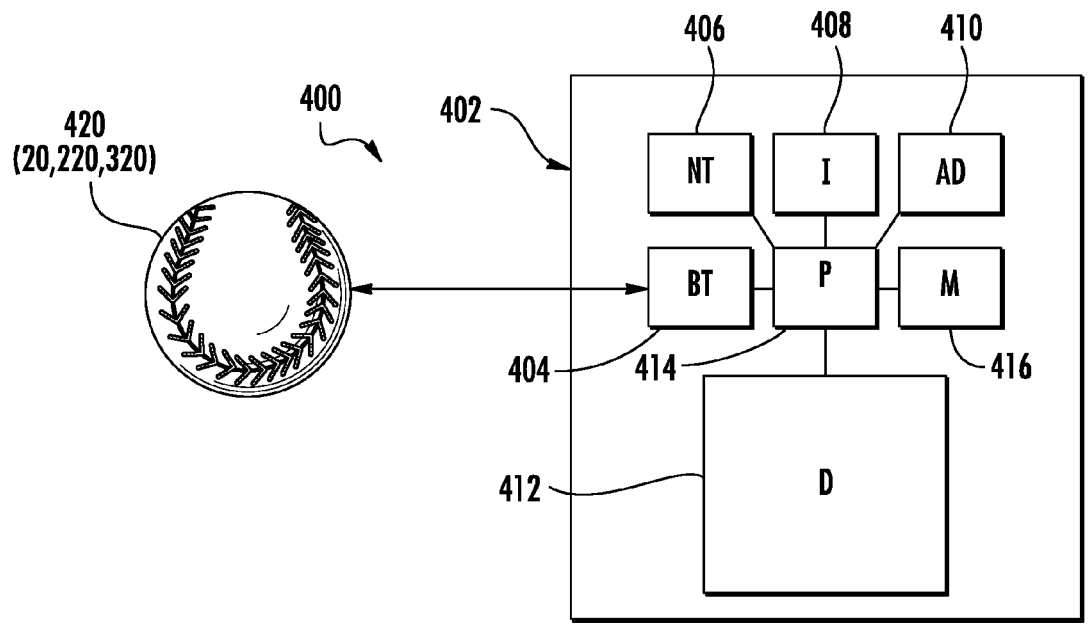
FIG. 10 is a diagram of an example ball sensing system including a ball and a schematic representation of a portable electronic device in accordance with another example implementation of the present invention.

FIG. 10 illustrates an example ball sensing system 400. Ball sensing system 400 comprises ball 420 and portable electronic device 402. Ball 420 comprises one of the balls 20, 220, 320 described above with respect to FIGS. 1-9, wherein ball 420 comprises a data output device 142, 242A that facilitates communication with an external portable electronic device, such as portable electronic device 402. As noted above, in one implementation, such communication may be made in a wireless fashion. In other implementations, such communication may be made in a wired fashion such as with a wire, cable or plug interconnecting ball for 20 with a portable electronic device. Such communication may utilize one or more intermediaries. In one implementation, ball 420 may communicate with a server using a local area network or wide area network (such as the Internet), wherein the server communicates with a portable electronic device.

Portable electronic device 402 comprises an electronic device to communicate with ball 420, to analyze sensed motion data from ball 420 and to present sensed motion data. Examples of portable electronic device 402 include, but are not limited to a smart phone, a flash memory reader (such as an IPOD), a cell phone, a personal data assistant (PDA), a laptop computer, a tablet or netbook or notebook computer and the like. As described hereafter, portable electronic device 402 enables a pitcher practicing pitches toward a strike zone to receive feedback on his or her pitches. In one implementation, portable electronic device 402 provides feedback and recommendations for future pitches. In one implementation, portable electronic device 402 provides prompt feedback to the pitcher or another person monitoring the pitcher in an accurate, reliable and entertaining manner without negatively altering the ball or the strike zone. In one implementation, the pitcher is provided with feedback as to the speed, the spin and/or the location of his or her pitches. As a result, the pitcher is notified if his or her velocity is dropping as the number of pitches increase. The pitcher may also be able to determine if the type of pitch he or she intended to throw actually was made and if so, how well.

Additionally, despite the pitcher pitching alone or against no other person, portable electric device 402 provides the pitcher with an estimate of whether a pitch that is thrown toward the strike zone might actually be contacted by a batter, and if so, how well. Moreover, portable electronic device 402 provides the pitcher with an indication of what type of pitch should be thrown, where and at what speed. Even in a practice environment, portable electronic device 402 allows a pitcher to determine the effectiveness of his or her pitches, such as his or her change-up, curve ball, sinker slider, pitch in the dirt etc. As a result, portable electronic device 402 enables the pitcher to monitor his or her progress overtime and share his or her activities with other pitchers, friends, teammates, coaches, etc. Portable electronic device 402 comprises ball transceiver 404, network transceiver 406, input 408, audio device 410, display 412, processor 414 and memory 416. Ball transceiver 404 comprises a device for directly communicating with ball 420. In one implementation, ball transceiver 404 comprises a wireless short wavelength radio transmission antenna such as a Bluetooth antenna. In another implementation, ball transceiver 404 comprises a radiofrequency identification (RFID) tag reader/writer. In another implementation, ball transceiver 404 comprises an infrared or other optical signal communication device. In some implementations, ball transceiver 404 may merely read data from ball 420 rather than transmitting commands or writing to ball 420. In some implementations, ball transceiver 404 may be omitted where communication with ball 420 is entirely done in an indirect fashion, such as through the use of network transceiver 406.

Network transceiver 406 comprises a device to communicate across a local area network (LAN) or a wide area network (WAN) such as the Internet. In one implementation, network transceiver 406 facilitates indirect communication with ball 423 an intermediary, such as an intermediate server or cloud that communicates with both ball 420 and portable electronic device 402. In one implementation, network transceiver 406 further facilitates the acquisition of data from remote data sources by portable electronic device 402 and facilitate the transmission of sensed motion data by device 402 to other remote locations across a LAN or WAN. In some implementations, network transceiver 406 may be omitted.

Input 408 comprises one or more input devices facilitating the input of data as well as commands, selections or instructions to portable electronic device 402. In one implementation, input 408 comprises a stylus, a touchpad, a mouse, a touch screen, a microphone with associated with speech recognition software, a keypad, a keyboard and the like. In one implementation, input 408 may be incorporated as part of display 412, wherein display 412 comprises a touch screen.

Audio device 410 comprises a device to output audible sound and/or signals. Audio device 410 allows portable electronic device 402 to communicate or indicate sensed motion data from ball 420 in an audible fashion. In some implementations, audio device 410 may be omitted or may not be utilized for communicating or indicating sensed motion data from ball 420.

Display 412 comprises a display monitor, screen or the like by which sensed motion data may be visibly presented. In one implementation, display 412 may comprise a touch screen further facilitating the input of selections or commands.

Processor 414 comprises one or more processing units to analyze sensed motion data from ball 420 and to present the results of such analysis or the sensed motion data that is received from ball 420 either audibly and/or visibly. For purposes of this application, the term "processing unit" shall mean a presently developed or future developed processing unit that executes sequences of instructions contained in a memory 416. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, portions of processor 414 and memory 416 or particular functions carried out by processor 414 and memory 416 may be embodied as part of one or more application-specific integrated circuits (ASICs). Unless otherwise specifically noted, portable electronic device 402 is not limited to any specific combination of hardware circuitry and software, nor to any particular source for the instructions executed by the processing unit.

Memory 416 comprises one or more non-transient or non-transitory computer-readable mediums or persistent storage devices containing computer-readable programming, software or code for instructing or directing processor 414 in the acquisition and analysis of sensed motion data 420 as well as the presentation of sensed motion data. Memory 416 may further locally store information such as raw sensed motion data, derived the sensed motion data, operational settings for ball 420, operational settings for portable electronic device 402 when interacting with ball 420 and various thresholds or triggers for presenting information pertaining to motion of ball 420.

Figure 11:
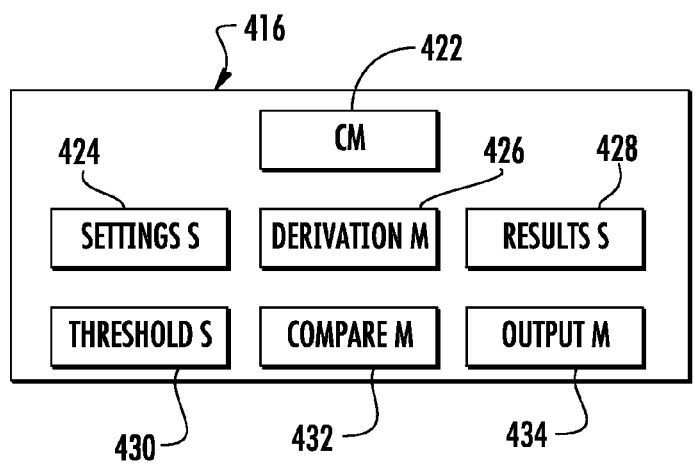
FIG. 11 is a schematic diagram of one example of a memory of the ball sensing system of FIG. 10.

FIG. 11 schematically illustrates one example of memory 416. Memory 416 comprises a communication module 422, settings storage 424, derivation module 426, results storage 428, threshold storage 430, compare module 432 and output module 434. Modules 422, 426, 432 and 434 direct processor 414 to obtain sensed motion data from ball 420, to derive pitch characteristics from the sensed motion data, to compare sensed motion data to one or more thresholds and to output the sensed motion data as well as information based upon the comparison. In one implementation, modules 422, 426, 432 and 434 direct processor 414 to carry out the example method 500 shown in FIG. 12.

Figure 12:
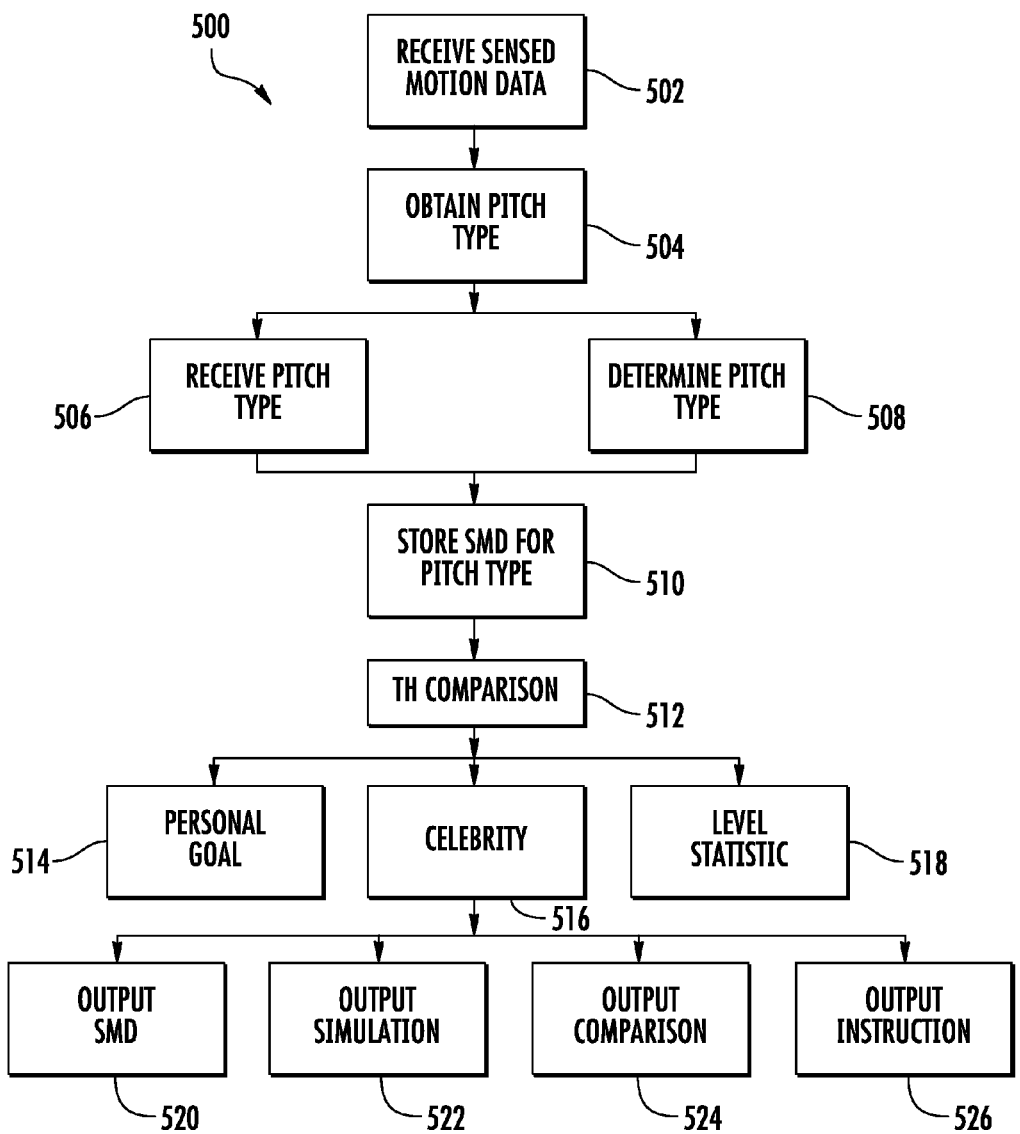
FIG. 12 is a flow diagram illustrating one example method that may be carried out by the system of FIG. 10.

FIG. 12 is a flow diagram illustrating one example method that may be carried out by system 400. As indicated by step 502, communication module 422 directs processor 414 to retrieve or receive sensed motion data from ball 420. In one implementation, the sensed motion data may be obtained utilizing ball transceiver 404. In another implementation, the sensed motion data may be obtained using network transceiver 406 and an intermediary, such as an intermediary server. In one implementation, the sensed motion data comprises raw sensed motion data. In another implementation, the sensed motion data comprises sensed motion data that has been derived from the raw sensed motion data either by a processor or circuit within ball 420 or by a processor or circuit at an intermediary cloud or server. In one implementation, the sensed motion data is obtained as the ball as being thrown. In another implementation of the sensed motion data is transmitted upon completion of a thrower's pitch.

In one implementation, communication module 422 automatically obtains the sensed motion data for each and every pitch when system 400 is activated. In another implementation, communication module 422 only obtains the sensed motion data for selected pitches. For example, according to a first optional or selectable setting preprogrammed or input by input 408 and stored in settings storage 424, communication module 422 may periodically sample pitches at a predetermined or predefined time frequency (i.e., once every three minutes) or pitch frequency (i.e., one out of every four pitches). According to a second alternative selectable setting, communication module 422 obtains sensed motion data from ball 420 in response to a user indicating through input 408 that the following pitch or predefined number of pitches (or immediately preceding pitch or pitches) are to be evaluated.

In one implementation, derivation module 426 derives characteristics of the pitch or throw from the raw sensed motion data. For example, based upon the raw acceleration signals from accelerometers 146, derivation module 426 derives a linear velocity of the throw or pitch. Based upon the raw signals from the gyrometer 148, derivation module 426 derives the spin axis and spin rate (spin acceleration) for the particular throw. In some implementations, sensor 140 or controller 256 within ball 420 drives the velocity, spin axis and spin rate from the raw signals prior to transmitting them to device 402.

As indicated by step 504, upon device 402 obtaining the sensed motion data (raw sensed motion data and/or derived sensed motion data) as well as other possible data (temperature, wind and the like), device 402 obtains the type of the pitch that was thrown. In one implementation, device 402 determines a pitch type directly from the set of raw sensed motion data rather than from a derived set of sensed motion data. As indicated by step 506, according to a first setting, selectable through input 408 and stored in setting storage 424, device 402 prompts a person to input the type of pitch that was just thrown or that is about to be thrown. For example, in one implementation, device 402 displays a plurality of graphical user interfaces correspond to a plurality of different pitch types on display 412, wherein the person is prompted to select one of the pitch types such as through contact on a touchscreen or selection using a stylus, mouse or cursor.

As indicated by step 508, according to a second alternative setting or mode of operation stored in setting certain 424 and selectable using input 408, the type of pitch is determined from the obtain sensed motion data. In one implementation, derivation module 426 directs processor 414 to determine or derive the type of pitch that was thrown from the sensed motion data. For example, a particular pitch type may have a signature characteristic spin axis or spin axis range. Particular pitch types may have a signature set or pair of spin axis ranges and/or spin rate ranges. Particular pitch types may have particular combinations of spin axis ranges, spin rate ranges and velocity ranges. In one implementation, derivation module 426 obtains the various ranges for the different pitch types from threshold storage 430 of memory 416. In another implementation, derivation module 426 obtains the various ranges for the different pitch types from a remote source through network transceiver 406.

In one implementation, device 402 presents or displays the determined pitch type. In one implementation, device 402 prompts or provides an opportunity for confirming or overriding the determined pitch type. According to one selectable setting, device 402 requires pitch type confirmation before proceeding. According to another selectable setting, device 402 provides the person with a predetermined or preselected window of time during which the person may override the device determined pitch type and enter the correct or the intended pitch type.

As indicated by step 510, processor 414 of device 402 stores the sensed motion data for the particular type of pitch. In other words, processor 414 groups the sets of sensed motion data for each throw based upon the type of pitch of each throw. The sensed motion data that is stored comprises both the raw sensed motion data as well as any derived sensed motion data. In other implementations, the sensed motion data may be stored in result storage 428 of memory 416 independent of the type of pitch or may be grouped based upon other criteria such as the day or time that the pitch was thrown, the evaluation of the particular pitch (top 10 percentile, bottom 10 percentile, average, weak, strong etc.) or based upon its clustering or order in a group or string of pitches (facilitating evaluation of the impact of fatigue on pitch performance during a string of pitches).

As indicated by step 512, comparison module 432 compares the sensed motion data for the particular type of pitch against one or more thresholds, ranges or evaluation criteria are stored in threshold storage 430 or obtained from a remote storage through network transceiver 406 (TH Comparison or threshold comparison). In the example illustrated, comparison module 432 offers a person with three selectable options or settings for comparison: comparison against a personal goal (block 514), comparison against statistics of a celebrity (block 516) or comparison against statistics associated with a particular level of play (block 518). In each case, the thresholds, ranges or evaluation criteria are stored in threshold storage 430 or in a remote storage, such as a cloud or remote Web server, accessible through network transceiver 406. In other implementations, other settings for comparison can be used.

In response to option 514 being selected, comparison module 432 retrieves the individual's personal goal for one or more values of sensed motion data from threshold storage 430 or from an external storage via network transceiver 406 and compares either an individual throw or a collective group of throws to the personal goal(s) for the sensed motion data value(s).

In response to option 516 being selected and stored as a setting in threshold settings 430, comparison module 432 compares a person's sensed motion data with that of a celebrity. For example, in one implementation, module 432 may compare detected parameters or characteristics of a velocity, spin rate or spin axis with a celebrity's throw or pitch of a ball. For example, module 432 may compare of one or more attributes of user's pitch with one or more attributes of the same pitch by a popular softball or baseball celebrity such a major league baseball player.

In response to option 518 being selected and stored as a setting in threshold settings 430, module 432 may compare user's pitch with statistical characteristics of the same pitch attribute for an aggregate of players, such as players belonging to a particular league, team, or level of play. For example, module 432 may compare a user's spin rate for a pitch with an average spin rate for the same pitch by Little League pitchers, Pony league pitchers, high school pitchers, travel league pitchers of a particular age range, minor-league pitchers, major-league pitchers and All-Star major-league pitchers. Similar comparisons may be made for other sensed motion data such as velocity and spin axis, or combinations of two or more of velocity, spin rate or spin axis.

In one operational mode or setting as selected using input 408 and stored in settings storage 424, comparison module 432 compares sensed motion data for an individual throw or pitch against one or more of the thresholds of blocks 514, 516 or 518. In a second operational mode or setting selected using input 408 and stored in settings storage 424, comparison module 432 compares a statistic associated with the sensed motion data of a plurality of throws or pitches to one or more thresholds of blocks 514, 516 or 518. For example, in one implementation, comparison module 432 may compare an average spin rate for all curveball pitches of record by an individual against the individuals personal goal (block 514), against an average spin rate of a celebrity ball player (the celebrity ball player being selected by the individual through input 408 or preprogrammed) for the same curveball pitches (block 516) and/or against an average spin rate for a selected play level such as average spin rate of a Little League pitcher, the average spin rate of a minor-league pitcher, the average spin rate of a major league baseball pitcher or the average spin rate of an All-Star major league baseball pitcher. Similar comparisons may be made for other sensed motion data such as spin axis, range of spin axis, ball travel or linear velocity. In another implementation, instead of comparing all pitches of a certain type that have been recorded against the one or more thresholds, comparison module 432 may compare one or more predefined user selected sets of pitches (entered through input 408), such as the last 10 pitches, the last 50 pitches, pitches made during a single practice session, pitches made during the last week, pitches made during the last month or a particular month, pitches made during a season, pitches made against a particular batter or simulated batter, and the like against the one or more thresholds of blocks 514, 516 and 518.

Figure 13:
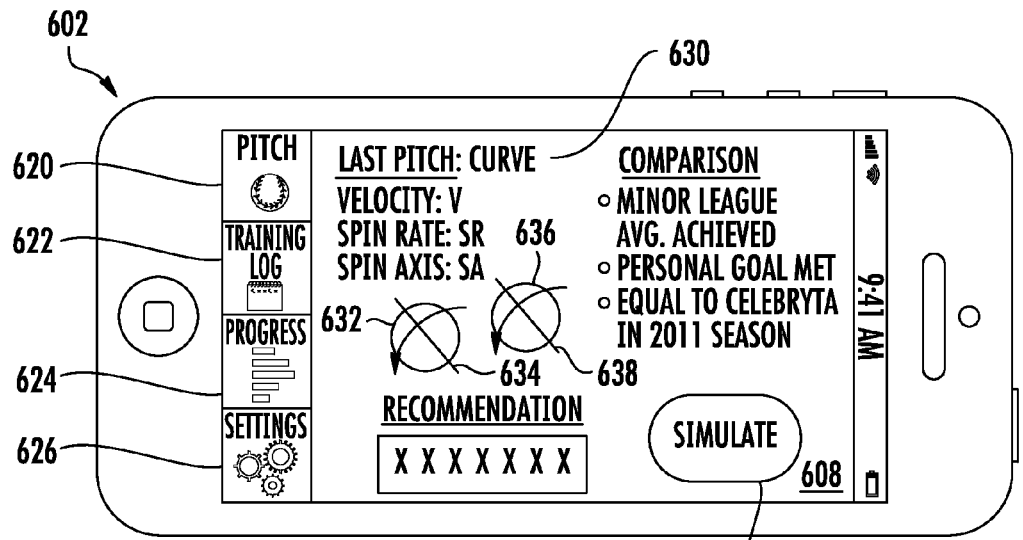
FIG. 13 is a front view of portable electronic device illustrating an example application of an individual pitch mode of the system of FIG. 10.

As indicated by blocks are steps 520, 522, 524 and 526, portable electronic device 402 provides various outputs to a person regarding a pitch or a group of pitches for evaluation. What specific outputs are presented and how they are presented are selected through customization by user through input 408, wherein the selected settings or modes are stored in settings storage 424. FIG. 13 illustrates one example of outputs on an example portable electronic device 602. In the example illustrated, portable electronic device 602 has an input 408 comprising a touchscreen 608. In the example illustrated, on the left side of touchscreen 608, device 602 present several graphic user interfaces or icons indicating different display options. In the example illustrated, the person may select output for the last individual pitch by selecting icon 620 or may select output for a historical pitch or historical group of pitches by selecting icon 622. By selecting icon 624, a person may be presented with output indicating progress over time for a particular type of pitch. By selecting icon 626, a person may adjust the operational settings or modes for device 602. In one implementation, by selecting icon 626, the person may also be provided with options to adjust an operational setting or mode of ball 420.

Figure 14:
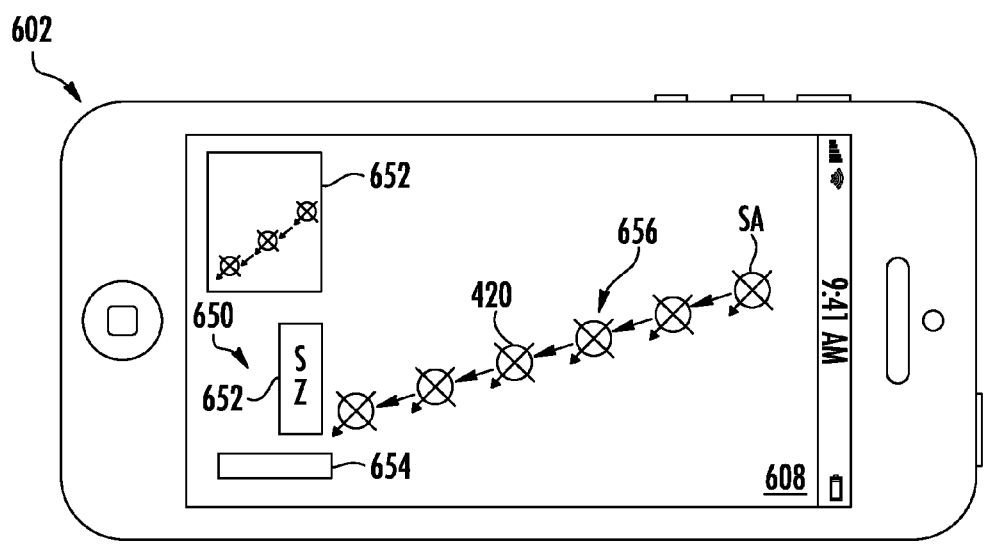
FIG. 14 is a front view of portable electronic device illustrating an example application of the system of FIG. 10.

FIGS. 13 and 14 illustrate portable electronic device 602 when the ball sensing application is in an individual pitch mode through the selection of icon 620. With the example, selected settings of device 602 outputs the sensed motion data per block 520 in FIG. 12. In the example illustrated, referring to FIG. 14, device 602 outputs the type 630 of the last pitch (as received in step 506 or as determined in step 508 of FIG. 12), the traveling velocity V the last pitch, the spin rate SR of the last pitch and an alphanumeric characterization of the spin axis SA of the last pitch. In the example illustrated, device 602 further provides a graphical representation 632 of a ball with an indication 634 of the spin axis SA. In one implementation, the graphical representation 632 of the ball may be visually spinning about the displayed spin axis 634. In one implementation, the speed at which the graphical representation 632 of the ball rotates about the spin axis 634 may vary depending upon the actual spin rate SR. In one implementation, one or more characteristics of the depicted axis 634, such as its color, line thickness, brightness or the like may change from pitch to pitch based upon how close the spin axis SR is with respect to a target spin axis or a range of target spin axes for the particular type of pitch thrown. In one implementation, one or more visual characteristics of the graphical representation 632 of the ball may vary from pitch to pitch based upon the velocity V of the pitch. For example, the color of graphical representation 632 may vary depending upon the detected velocity of the thrown pitch. In other implementations, the color, brightness, size or other characteristics of graphical representation 632 can varied to indicate other sensed motion data. In some implementations, device 602 may additionally present a target or goal for the same pitch and provide a side-by-side comparison. In the example illustrated, device 602 presents a graphical representation 636 of the ball spinning about a target spin axis 638 at an illustrated target spin rate SR or minimum threshold SR (a threshold from block 514, 516 or 518).

Per block or step 524 of FIG. 12, device 602 further outputs one or more comparisons. In the example illustrated in FIG. 14, device 602 provides each of the comparisons per block 514, 516 and 518. In particular, device 602 outputs an evaluation of the level of the particular pitch. In the illustrated example, device 602 indicates that the last pitch is comparable to a curveball pitch of a minor-league baseball player. In the example illustrated, device 602 further indicates that the person's personal goal for the curveball pitch was met. As noted above, this goal may be a personal goal for one or more of velocity, spin rate, spin axis and/or other throw characteristics. In the example illustrated, device 602 further provides a comparison of the last throw to a statistic associated with a celebrity ball player. In the example illustrated, device 602 indicates that the last pitch had sensed motion data characteristics equal to "celebrity A" (such as a particular major league baseball player during a particular season). In other implementations, some of such comparisons may be omitted or additional comparisons may be provided.

In accordance with block 526 in FIG. 12, device 602 further outputs one of more instructions, suggestions or recommendations given the last pitch or given the results of a predetermined number of prior pitches including the last pitch. For example, such recommendations may include recommendations regarding gripping of the ball, release of the ball, arm or hand movement or other suggestions for achieving target motion of ball 420.

As indicated by block 522 in FIG. 12, in one implementation, device 602 further provides the person with an option of viewing a simulation of the completed pitch with respect to a strike zone. Referring to FIG. 13, the assimilation may be selected by a person selecting graphical user interface 640. FIG. 14 illustrates one example simulation. Device 602 provides a screen presenting a side view 650 of a strike zone 652 and plate 654 as well as a front view of the strike zone 652. Based upon sensed motion data such as velocity, spin axis and/or spin rate, derivation module derivation module 426 determines a travel path of ball 420. Given a predefined distance between the pitcher's mound (or pitcher's location) and the home plate in a predefined general strike zone 652, derivation module 432 determines an intersection of the path with respect to the strike zone 652. In one implementation, this intersection is presented on display screen 608. In one implementation, the path 656 of ball 420 is simulated through multiple still shots or through animation. In the example illustrated, the spin axis SA of ball 420 is also visibly presented with the presented ball 420 rotating about the spin axis SA as it moves towards the strike zone 652. In other implementations, other simulations or simulation views may be provided. Still other implementations, such simulations may be omitted. The front view of the strike zone 652 can be used to indicate the location of the ball 420 as it crosses the simulated strike zone. The front view may show the current pitch location crossing the strike zone, or the current pitch and one or more previous pitches.

Figure 15:
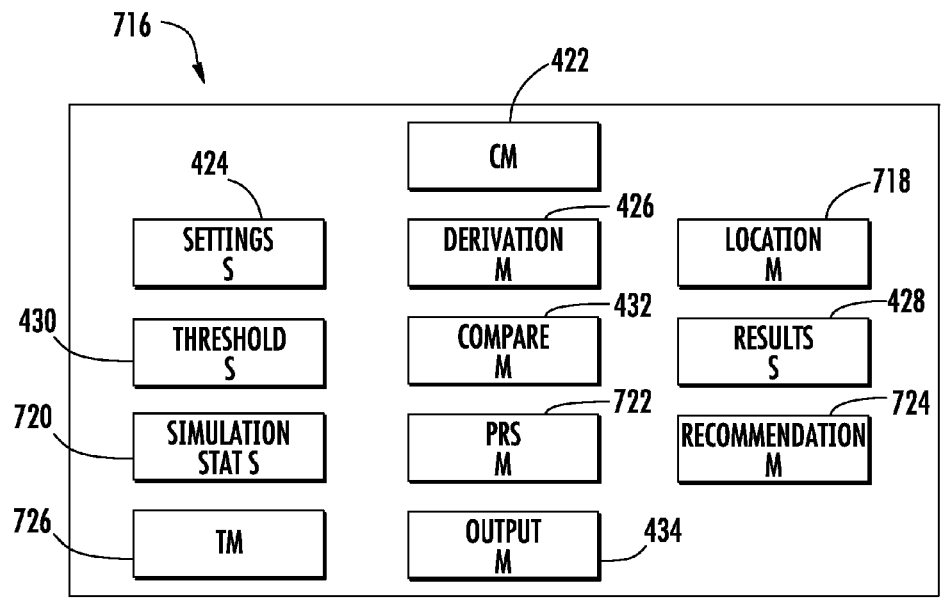
FIG. 15 is a schematic diagram of another example of a memory of the ball sensing system in accordance with another implementation of the present invention.

FIG. 15 schematically illustrates memory 716, another example implementation of memory 416 for use as part of ball sensing system 400 shown and described above with respect to FIG. 9. Memory 716 contains computer-readable instructions or software code to additionally direct ball sensing system 400 to simulate batting results based upon one or more sensed characteristics or parameters of a throw or pitch of the real-world physical baseball (or softball).

Memory 716 is similar to memory 416 except that memory 716 additionally comprises location module 718, simulation statistics storage 720, pitch result simulation module 722 and tracking module 724. Those remaining components of memory 716 which correspond to components of memory 416, described above, are numbered similarly.

Location module 718 comprises programming, code or other computer-readable circuitry or instructions to direct processor 414 (shown in FIG. 9) to retrieve or receive signals for movement of ball 420, or another thrown ball, relative to a strike zone. Location module 718 comprises instructions that direct processor 414 to determine a location of the thrown ball relative to a strike zone as it crosses home plate. The determined location is utilized by pitch result simulation module 722 to determine a simulated batting result for an individual pitch of an actual ball.

Figure 16:
FIG. 16 is a side view illustrating one example method that may be utilized by the ball sensing system for determining a location of a thrown ball or pitch of the ball relative to the strike zone.

FIG. 16 illustrates one example method that may be utilized by location module 718 for determining a location of a thrown ball 402 (or another ball) or pitch of the ball relative to the strike zone as indicated by one or more signals. In the example illustrated in FIG. 16, ball 420 comprises a marking 750 such as an arrow, dot or the like which is to be pointed towards or aimed at a strike zone 754 over a home plate 756. Ball 420 is positioned upon a tee 760 having a known height, such as 3 feet (from the mound, or from the ground). While resting upon tee 760, signals are received from ball 420, calibrating the initial position of ball 420 upon tee 760 at a known initial position, a predetermined height, a predetermined angular orientation relative to strike zone 754 and a predetermined distance from home plate 756. Alternatively, one or more of the above pieces of information, such as the predetermined height, predetermined angular orientation or predetermined distance may be manually entered and provided to processor 414 by input 408 (shown in FIG. 9). During the actual throw of ball 420, processor 414 utilizes signals from ball 420 to track the motion of the ball, wherein such signals are utilized to determine the spin, speed and location of the ball when it reaches strike zone 754.

Figure 17A:
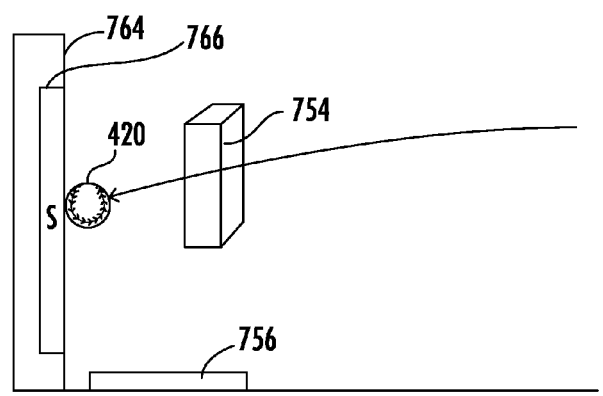
FIGS. 17A and 17B are side views illustrating alternative example methods and systems that may be utilized by the ball sensing system for determining a location of a thrown ball or pitch of the ball relative to the strike zone including a backstop.

FIG. 17A illustrates another example method that may be utilized by location module 718 for determining a location of a thrown ball 402 (or another ball) or pitch of the ball relative to the strike zone as indicated by one or more signals. In the example illustrated, ball sensing system 400 additionally comprises a backstop 764 supporting one or more sensors 766 behind home plate 756. In one implementation, backstop 764 comprises a tarp or other panel which is hung or mounted from a fence, wall or frame. Sensors 766 sense where a pitched ball 420 impacts backstop 764. In one implementation, sensors 766 sense not only whether a pitched ball 420 has passed through strike zone 754, but the particular location relative to strike zone 754. The backstop 764 may be positioned behind home plate 756 In one implementation, strike zone 754 is divided into nine sections. Sensors 766 determine which of the nine sections of the strike zone 754 the ball impacts or passes through the strike zone.

Figure 17B:
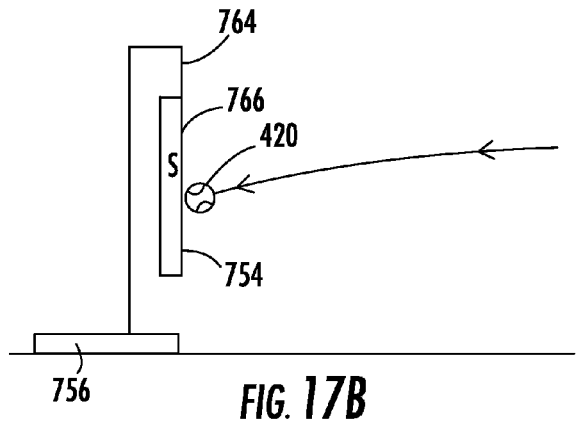
Figure 17D:
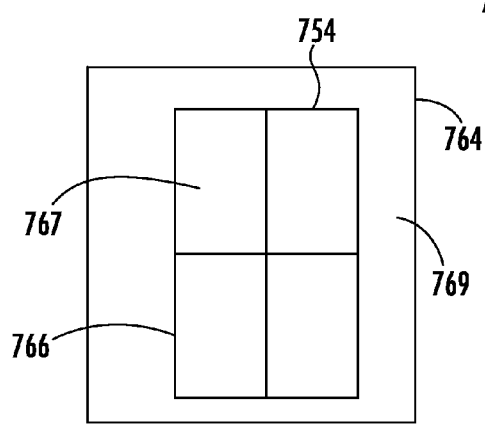
FIGS. 17C through 17E are front views of example configurations of a backstop of the ball sensing system in accordance with alternative implementations of the present invention.
Figure 17E:
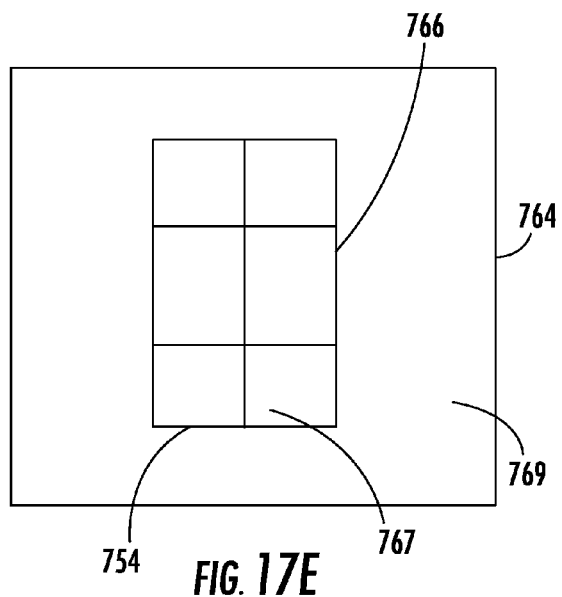
Figure 17C:
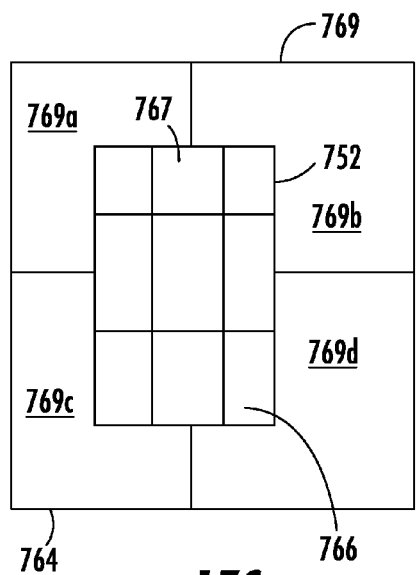

Referring to FIG. 17B, in another implementation, the backstop 764 can be positioned in line with (or generally along the same vertical plane as) the front edge of home plate 756 such that the back stop 764 defines the strike zone 754. Referring to FIG. 17C, the backstop 764 can be configured to define nine sections 767 of the strike zone 752 and a ball section 769 defined by the area of the back stop 764 outside of the strike zone 752. The ball section 769 can be further broken down into subsections of high and outside 769a, high and inside 769b, low and outside 769c and low and inside 769d. Referring to FIGS. 17D and 17E, in other implementations, the strike zone 754 of the backstop 764 can be configured to define four or six sections 767, respectively. In other implementations, the backstop 764 can be configured to define other numbers of sections and subsections to the strike zone and the area outside the strike zone. The backstop 764 can be configured with memory 716 and/or portable electronic device 602 to define the backstop 764 into any number of sections and subsections within or outside of the strike zone 754.

In one implementation, sensors 766 are further configured to detect the speed and/or spin of ball 420. In such implementations, a ball omitting any sensors or having fewer sensors may be utilized in lieu of ball 420 having the above-described sensors. Accordingly, the speed and/or spin of the ball 420 can be determined from sensors 766 and/or the sensors 140. Signals from sensors 766 are transmitted in a wired or wireless fashion to processor 414 for the determination or identification of the location of the ball according to instructions provided by location module 718.

In yet other implementations, the location of the thrown ball relative to strike zone 754 may be determined by ball sensing system 400 and location module 718 in other fashions. For example, one implementation, the location of a thrown ball relative to strike zone maybe determined through the use of one or more cameras. In still other implementations, the location of the thrown ball relative to the strike zone may be manually input by the person throwing the ball, by a person catching the ball or by another person using input 408.

Simulation statistics storage 720 comprises storage portion of memory 716 for storing hitting or batting statistics for one or more simulated batters. Such statistics are utilized by pitch result simulation module 722 to determine simulated results for an actual thrown ball. In one implementation, such statistics comprise a batting percentage for one or more different sensed pitch parameters such as one or more of different locations (sections 767 and 769 or subsections 769a thru 769d) relative to the strike zone, different speeds and different spins. For example, a batter may have a first hit percentage for pitches within a first range of locations at a first range of speeds with a range of spins and may have a second different hit percentage for pitches at a second range of locations at a second range of speeds and a second range of spins. The location of the hit, the result of the hit (single, double, home run) and the like may be associated with the pitch parameters. In such an implementation, pitch result simulation module 722 may utilize such statistics and one or more of the sensed pitch parameters of the actual thrown ball to determine a binary result, whether or not the result of the pitch was a hit. In such an implementation, the characteristic of the hit itself, whether the hit was a single, double, home run or the like, are randomly determined using a random generator or may be determined using other sensed parameters or factors.

In one implementation, such statistics comprise a percentage chance for the pitched ball parameters for each of different batting results such as bunt, single, double, triple, home run, sacrifice fly, fly out, ground out, double play, strike, foul ball and the like. For example, the statistics may indicate that a particular simulated batter: has a 40% chance of hitting a single to right field for a pitch within a first region or section of the strike zone, at a first speed range and at a first spin range; has a 60% chance of hitting a triple to left field for a pitch within a second section of the strike zone, at a second speed range and at a second spin range; has an 80% chance of hitting a double to left field for a pitch within the second section of the strike zone, at a third speed range and at the second spin range; has an 80% chance of hitting a foul ball for a pitch within a first section outside the strike zone, at a third speed range and at the second spin range; has a 90% chance having a strike called for a pitch within a fourth section of the strike zone, at a fourth speed range and at the first spin range; has a 80% chance of having a swung strike for a pitch within a fifth section of the strike zone at a fifth speed range and at the second spin range, and so on. In such an implementation, pitch result simulation module 722 may utilize such statistics and the sensed pitch parameters of the actual thrown ball to determine whether or not the result of the pitch was a ball, a strike or a hit, and if the result was a hit, the type of hit (whether the hit was a single, double, home run, foul ball, bunt) or the like. In one implementation, pitch result simulation module 722 may additionally output the simulated location of the hit (right field, left field, centerfield or the like) using such statistics.

In one implementation, the statistics stored in storage 718 may additionally include other factors which may impact the simulated batting result for a given sensed pitch. For example, in one implementation, the statistics stored in storage 718 may additionally vary based upon the previous pitches thrown to the simulated batter during an at-bat and/or during earlier at-bats. For example, a series of prior pitches thrown to the simulated batter at a first location or of a first type may increase the likelihood of a strike when the present pitch is thrown at a second location or of a second type. In such a manner, such statistics stored in stored 718 take into account or allow a simulated batter to be "setup" with a pattern of prior pitches.

Pitch result simulation module 722 comprises computer-readable instructions, code, software circuitry to direct processor 414 to determine a simulated pitch result based upon the sensed pitch parameters received by communication module 422 and the statistics for the simulated batter retrieved from storage 718. In one implementation, pitch result simulation module 722 consults a digital lookup table identifying simulated batting results based upon the detected pitch characteristics. As noted above, in one implementation, pitch result simulation module 722 may utilize the detected pitch characteristics to identify a binary (a hit or no hit) result using the statistics in storage 718. In such an implementation, if a hit does result, pitch result simulation module 722 may utilize a random number generator or other factors or parameters for identifying the type of no hit (called strike, swinging strike, foul ball, called ball) or the type of hit such as a single, double, home run of the like.

In another implementation, pitch result simulation module 722 may utilize the detected pitch characteristics in conjunction with statistics stored in storage 718 to determine not only whether a hit or a miss occurred, but the type of hit or miss such as a called strike, a swinging strike, foul ball, called ball, single, double, home run, bunt or the like.

In some implementations, using such statistics stored in storage 718 and the sensed or detected characteristics of the pitch, pitch result simulation module 722 additionally determines the location and distance of simulated ball travel. For example, pitch result simulation module 722 may determine whether the simulated travel the ball was to left field, right field, centerfield as well as the depth or distance of the hit. In such implementations, the result of the hit may vary depending upon the location and distance of the ball travel. For example, if the simulated field or ballpark has a shallow right field, a deep hit to the right field may result in a home run, whereas if the simulated field or ballpark has a relatively deep right field, a deep hit to the right field may result in a fly out or a triple. By determining the simulated location and distance of a hit, simulation module 722 may simulate different results for different ballparks or fields of play.

In some implementations, pitch result simulation module 722 allows two persons to engage in a simulated game, wherein each person takes turns, one person managing the defense (shifting the infielders or outfielders and the like) while throwing the sensed pitches of an actual ball while the other person "manages" his or her lineup of simulated batters and instructing the simulated batter as to the at-bat. For example, the person managing the lineup may alter the order of simulated batters or substitute similar to batters in the lineup. The person managing the lineup may alternatively or additionally manage the at-bat of the simulated batter by entering a command or instruction on input 408 (shown in FIG. 10). For example, the person managing the simulated at-bat may signal or instruct the simulated batter to bunt. Based upon such input, pitch result simulation module 722 utilizes statistics from storage 720 or module 718 for the simulated batter when the simulated batter is attempting to bunt in conjunction with the sensed pitch characteristics to determine the result of the pitch-whether the pitch resulted in a successful bunt, a throw out, a strike, a ball or the like. In such an implementation, pitch result simulation module 722 provides a more realistic simulation of a baseball inning or game implementing actual thrown balls by one or more persons. In some implementations, the sensed characteristics of the thrown balls are stored for subsequent use in a simulated game against a lineup of simulated batters under the management of the computer or another person. The memory 716 and the ball 420 can also be used to determine the duration of the pitch. Therefore, if the simulated inning includes a runner at first base with one out, the recommendation module 724 can recommend at particular pitch from the stretch position as opposed to a full wind-up. If the pitch duration indicates a full wind-up or slow delivery is occurring from the pitched ball, the simulated instructions may indicate that the runner on first has stolen second base.

Recommendation module 724 comprises computer-readable instructions, code, software or circuitry to direct processor 414 to determine and output a suggested or recommended pitch to the simulated batter. Prior to the pitch, recommendation module 724 retrieves different batting percentages and different betting results for a particular simulated player from storage 720 for different ball speeds, ball spins and/or ball locations. Based upon such statistics, recommendation module 724 acts like a catcher by recommending to the person about to pitch the ball a ball speed, ball spin/pitch type and/or ball location. Some implementations, recommendation module 724 may additionally base the recommendation being output for an upcoming pitch on other factors such as the current ball and strike count, the number of outs in the inning, the number or location of base runners in the inning, the particular simulated inning of the game and/or the current score of the simulated game. In some implementations, recommendation module 724 may be omitted.

Tracking module 726 comprises computer-readable instructions, code, software or circuitry to direct processor 414 to keep count of or track the results of multiple individual pitches and the simulated pitch results during a simulated at-bat by the simulated player. In one implementation, tracking module 726 further tracks the sequence of pitches and their associate ball speeds, ball spins and ball locations, wherein such tracked information is used by pitch result simulation module 722 to output a simulated batting result and/or wherein such tracked information is used by recommendation module 724 to recommend an upcoming pitch type, speed and/or location. For example, in response to the sensed velocity of the actual thrown balls lessening, indicating that the pitcher is tiring, recommendation module 724 may recommend a different pitch type, location and/or speed. In one implementation, tracking module 726 further tracks a plurality of simulated at-bats for a plurality of simulated players having a simulated batting order during a simulated game, wherein tracking module 726, utilizes such tracked data, further directs processor 414 to determine and output (following the instructions of output module 434) scoring during simulated innings based upon the simulated pitch results, facilitating the simulation of an inning or game. For example, a batter may have a unique performance level for each section of the strike zone. If the strike zone is divided into 9 sections as in FIG. 17A, the batter may have 9 different performance levels. Accordingly, the likelihood of a pitched ball being hit or hit well can depend upon where the ball crosses or impacts the strikezone 754 (or outside of the strike zone 754).

Figure 18:
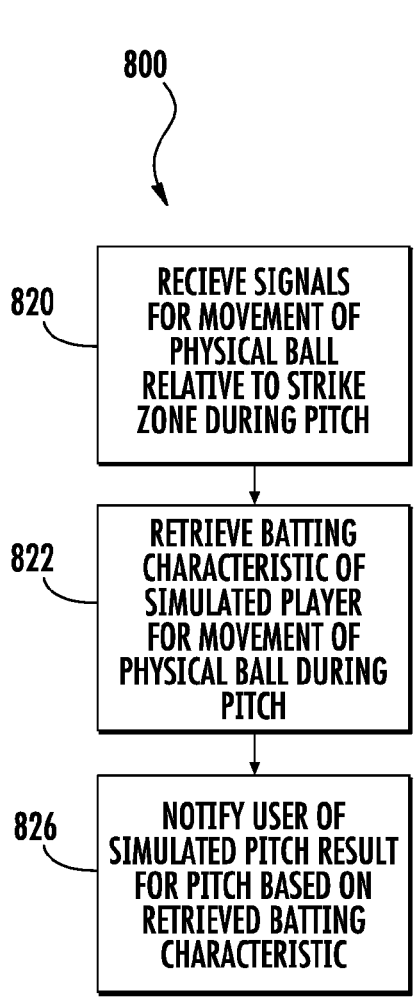
FIG. 18 is a flow diagram of an example method that may be carried out by the ball sensing system of FIG. 15.

FIG. 18 is a flow diagram of an example method 800 that may be carried out by ball sensing system 400 comprising memory 716. As indicated by step 820, ball transceiver 404 receives signals for the movement of a thrown real world or physical ball, such as ball 420 or another ball lacking such sensors such as when backstop 764 is employed. Derivation module 426 determines characteristics of the pitch while location module 718 determines the location of the pitch relative to a strike zone.

As indicated by step 822, pitch result simulation module 722 retrieved batting characteristics for a simulated player for the movement of the physical ball during the pitch. Pitch result simulation module 722 directs processor 414 to retrieve a simulated pitch result based upon the detected movement-speed, spin and location-of the ball. Baseball and softball players typically have different performance levels for balls in different sections in and out of the strike zone. For example, some hitters perform very well on pitches that cross the inside sections of the strike zone but poorly on pitches on the outside sections of the strike zone. Other hitters have different performance attributes. Accordingly, each batter typically will have different performances for different sections of the strike zone (or pitches outside of the strike zone). For example, a simulated batter may have different batting percentages depending upon the location, spin and/or location of the ball during a pitch. A similar batter may have different pitch results, strike out, called ball, foul ball, single, double, home run and the like depending upon location, spin and/or location of the ball during a pitch.

As indicated by step 826, pitch result simulation module 722 determines the simulated result of the pitch based upon the retrieved batting characteristic corresponding to the detected pitch characteristics. Output module 434 notifies the user of the simulated pitch result on display 412 or through audio device 410, informing the person whether or not the pitch resulted in a hit, a foul ball, a called ball, a called strike or a swinging strike. In some implementations, output module 434 notifies the user of whether the hit was a single, double, triple, home run or bunt. In some implementations, output module 434 notifies the user of the simulated location and/or distance of the hit.

Figure 19:
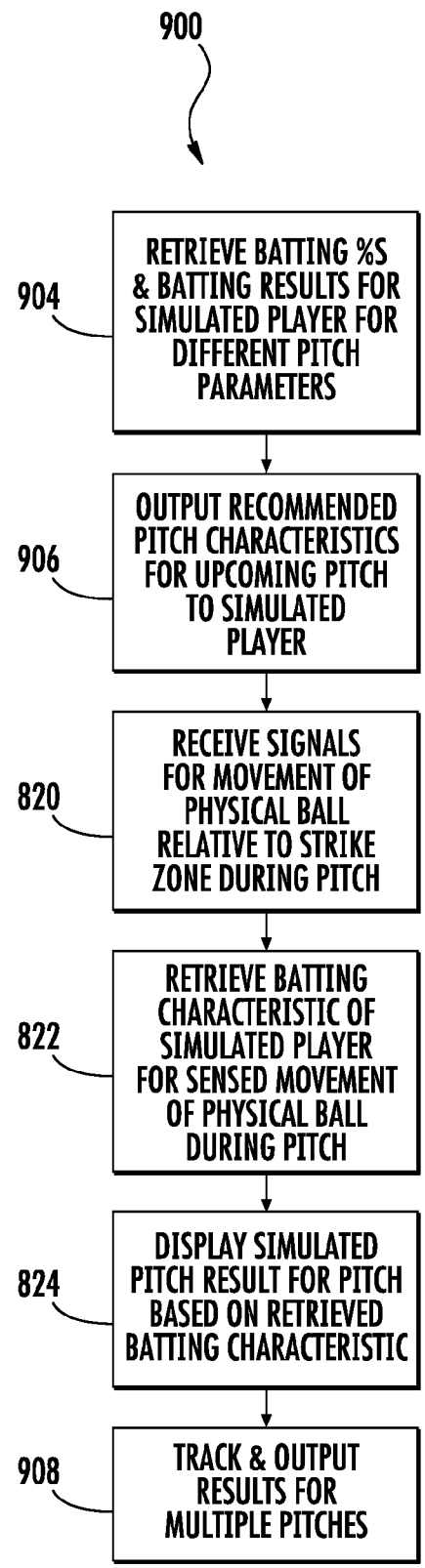
FIG. 19 is a flow diagram of another example method that may be carried out by the ball sensing system of FIG. 15.

FIG. 19 is a flow diagram of method 900, another example method that may be carried out by ball sensing system 400 comprising memory 716. Method 900 is similar to method 800 except the method 900 additionally comprise steps 904 and 906 which provide a pitcher with recommended pitch characteristics for an upcoming pitch based upon batting characteristics of a simulated player or batter given the particular circumstances in the game simulation. Method 900 additionally comprises step 908 which tracks and outputs results for multiple pitches, facilitating the tracking of complete at-bats, innings, games and seasons.

As indicated by step 904, recommendation module 724 retrieves batting percentages and batting results for one or more different pitch parameters for the simulated player or simulated batter currently at-bat in the simulation. The term "pitch parameters" can encompass not only the velocity of the pitch, the type of the pitch and the location of the pitch relative to the strike zone, but also can encompass one or more additional factors related to the pitch such as the inning in which the pitch is thrown, the number of outs in the inning, the number and/or location of base runners at the time the pitch is made, the ball and strike count existing at the time of the pitch, the characteristics of the series of pitches made to the simulated batter prior to the upcoming pitch in either the current at-bat or prior at-bats, and environmental conditions such as temperature, wind speed and direction, the field are ballpark in which the pitch is being made and time of day (day game or night game). In one implementation, such statistics are retrieved from simulation statistics storage 718.

Such statistics may indicate that the simulated batter currently at-bat has less success with hitting or making contact with a ball pitched to the low outside corner of the strike zone. Such statistics may indicate that simulated batter currently at-bat has less success with hitting or making contact with a particular type of pitch such as a breaking ball to a particular region of the strike zone or a particular curveball. Such statistics may indicate that the simulated batter currently at-bat has a lower hitting or batting percentage for certain types of pitches or pitches thrown to particular regions of the strike zone when the pitch follows a particular series of pictures. For example, such statistics may indicate that the simulated batter has less success hitting a curveball across a particular region of the strike zone that follows a fastball across another particular region of the strike zone. Such statistics may indicate that the simulated batter currently at-bat has a lower batting percentage when a particular type of pitch across a particular region of the strike zone is made at a particular point in the ball and strike count for the at-bat. A batter's performance level can change depending upon the ball-strike count. For example, such statistics may indicate that the simulated batter is more likely to swing and miss the thrown ball when the pitch is of a particular type across a particular region relative to the strike zone (in or out of the strike zone) when the count is three balls and two strikes. Such statistics may indicate that the simulated batter is less likely to hit a particular type of pitch made to a particular region of the strike zone during a day game as compared to a night game or in a particular ballpark as compared to another ballpark. Such statistics may indicate those pitch parameters at which the simulated batter is less likely to hit the pitch or may alternatively indicate those pitch parameters in which a simulated batter is more likely to hit the pitch. Such statistics may indicate those pitch parameters at which the simulated batter is less likely are more likely to achieve a particular result such as those pitches for which the simulated batter is less likely or more likely to hit a home run, a double, a triple or the like. Such statistics may indicate those pitch parameters at which the simulated batter is less likely or more likely to hit a pitch to a particular region of the playing field or ballpark.

As indicated by step 906, recommendation module 724 utilizes the retrieved batting percentages and batting results for the simulated player for the different pitch parameters to identify and recommend pitch characteristics for the upcoming pitch to the simulated player. For example, if the count is two balls and one strike, recommendation module 724 may output a recommended type of pitch at a particular speed and across a particular region relative to the strike zone that is different if the count is alternatively three balls and two strikes. If the previous pattern of pitches that particular characteristics, recommendation module 724 may output a recommended type of pitch at a particular speed and across a particular region relative to the strike zone which is based upon the prior series of pitches "setting up" the simulated batter. If the simulated game is a night game in which the statistics retrieved for the simulated batter are statistics for when the simulated batter is batting during a night game, recommendation module 724 may recommend pitch characteristics that may differ from the recommend pitch characteristics for the simulated batter during a day game. In each of the foregoing examples, recommendation module 724 may alternatively recommend a fewer or greater of such pitch characteristics. For example, in lieu of recommending each of the pitch speed, the pitch type and the pitch location, recommendation module 724 may alternatively output just a recommended pitching location or just a particular type of pitch or just a particular niche speed or range of speeds. In essence, recommendation module 724 serves as a dynamic smart catcher or manager advising the person throwing the real world ball as to what pitch characteristics are best for the simulated batter at the particular point of time (ball-strike count, number of outs, base runner situation or the inning) in the simulated game.

In one implementation, display 412, upon which the recommended pitch characteristics are presented to the person throwing the ball, is part of a portable electronic device or mobile device carried or worn by the person throwing the ball. For example, display 412 may be provided as part of optical glasses worn by the pitcher, as part of a wrist band or watch worn by the pitcher, or as part of other articles of clothing worn by the pitcher such as a display panel on the underside of a duckbill of the player's cap or the like. As a result, the pitcher may receive immediate feedback as to the prior pitches while the pitcher remains on the pitching mound and without the pitcher having to reach into his or pockets to you a smart phone or other display device. Consequently, pitches may be made in succession without substantial interruption, more closely simulating the relatively short periods of time between consecutive pitches in a real game.

In some implementations, in lieu of system 400 being used in a simulation of a game, system 400 may alternatively be utilized for preparation of a pitcher in a real game against real batters or may be utilized by a pitcher or by a person advising the pitcher (catcher or manager) during a real game, wherein the statistics storage 720 utilized by recommendation module 724 constitute statistics for the real batters that a pitcher is expected to face in a lineup or is currently facing during a real game. In implementations where display 412 may be provided as a portable display device worn by the pitcher (described above), system 400 provides a pitcher with dynamic pitch by pitch recommendations for the particular real-world batter using the one of more pitch parameters and associated statistics for the real-world batter. In such an implementation, system 400 may be utilized with regulation baseballs, softballs or other balls, wherein feedback regarding the location, type of pitch and speed or velocity the pitch may be retrieved from other sensors or may be manually input during the real game. In some implementations, system 400 may be utilized with regulation baseballs, softballs or other balls without feedback regarding thrown pitches, wherein system 400 simply provides dynamic recommendations for pitch characteristics to a particular batter given the particular batters batting percentage or batting results for different pitch parameters as retrieved from statistics storage 720.

As indicated by step 908, tracking module 726 directs processor 414 to track and output results for multiple pitches. Tracking module 726 facilitates a simulation of a complete at-bat, a complete inning being pitched, a complete game being pitched and/or a complete season being pitched. Tracking module 726 further facilitates the use of statistics for a first simulated batter which may vary depending upon the simulated batting result of pitches to one or more prior simulated batters. For example, tracking module 726 records and tracks the batting results of a first simulated batter, wherein the results of the first simulated batter may impact the statistics utilized for the next simulated batter. If the simulated result of an at-bat by a first batter is a single and if the simulated result of an at-bat by a second batter is a second single, tracking module 726 may determine that the second single advanced the first batter to second. In one implementation, utilizing the determination by tracking module 726 that there is a runner in scoring position on second base, recommendation module 724 and/or pitch result simulated module will retrieve statistics from statistics storage 720 for the third simulated batter when the third simulated batter has an at-bat with a runner in scoring position.

Because tracking module 726 tracks and outputs results for multiple pitches to multiple simulated batters per step 908, system 400 may simulate an entire inning, game, series, playoffs, World Series or season. As a result come system 400 may provide the user or pitcher with statistics that correspond to real world statistics for real-world pitchers such as earned run average (ERA), base on balls, based on balls per nine innings pitched, basic pitch count, batters faced, earned runs, hits allowed, hits per nine innings, walks and hits per inning pitched (WHIP), home runs allowed, runs per nine innings, innings pitched, perfect games, pitch count, run average, runs per nine innings, strikeouts, strikeout to walk ratio, wild pitches, win-loss records and the like.

In some implementations, comparison module 432 may compare the statistics of the user or pitcher, facilitated by tracking module 726, to predefined thresholds to assign and output achievement levels to the user or pitcher. For example, comparison module 432 and output module 434 may cooperate to notify the user that he or she has "made the team", has attained a certain status such as a varsity status, college status, minor-league status or major-league player status, or has achieved a certain role such as a starting pitcher, a mid-inning relief pitcher, or a closer based upon stored pitching results for the user.

In one implementation, depending upon the pitching role of the user, system 400 simulates different game situations. For example, if the person using system 400 is assigned a closer role based upon his or her prior sensed pitching characteristics or simulated pitching results by system 400, or has requested or selected his or her simulated role to be that of a closer, the person using system 400 will be asked to throw pitches under a closing situation, such as the bottom of the ninth inning. In one implementation, the existing score of the game, the number of base runners inherited by the closer, the stage of the inning in which the closer begins, as well as the batting lineup to be faced are randomly or statistically predetermined by tracking module 726 to establish the circumstances of the simulation for the user of system 400 in the closing role. In yet other implementations, the user may input details regarding the circumstances in which he or she enters the simulated game. In the example circumstance where the person pitching is assuming the role of a closer, the statistics retrieved by pitch result simulation module 722 and recommendation module 724 from simulation statistics storage 720 will be those statistics for a closing situation, such as the bottom of the ninth inning. As a result, recommendation module 724 may output different recommended pitch characteristics (one or more of pitch spin speed and location) as compared to when the pitcher been assigned a role of a starter. Recommendation module 724 may output recommendations for pitch characteristics that take into account or that are based upon the likely fewer number of total pitches that the pitcher, in the closing role, will be asked to make. For example, recommendation module 724 may request pitches of higher velocity. Likewise, the simulated hitting or batting results output by pitch result simulation module 722 may also vary given the particular inning.

In each of the foregoing descriptions, the simulated batter may comprise a processor generated player having predefined batting statistics or may comprise an avatar of a real-world player, wherein the statistics associated with this simulated player are statistics for the real-world player. In one implementation, the statistics may be statistics for actual or real-world players for real-world teams. For example, storage 720 may comprise batting statistics for existing or historical real-world players on existing or historical real-world teams, allowing the person using system 400 to simulate a pitching outing against such real-world players or real-world teams. Such real-world players or real-world teams may be taken from high school teams, college teams, minor-league baseball teams, major-league baseball teams, All-Star teams, Hall of Fame teams or user composed or customized teams of existing or historical real-world players. The system can also be configured to apply a multiplier or a handicap to a particular player's statistics. For example, the statistics for a Major League baseball player may be handicapped or reduced to more closely match the skill level of the user as pitcher. In another example, the user's team or another team in the user's league or other league may have their batters' statistics multiplied by a factor to increase their performance level to simulate a tougher batting order, or a batting order that has improved over the course of a season.

Although each of the modules of system 400, such as modules 718, 720, 430, 432, 428, 722, 724 and 726, are illustrated as being provide on memory 716 which is part of portable electronic device 402, in other implementations, one or more of such modules may be remotely located relative to portable electronic device 402, wherein each of the one or more modules may direct a remotely located processing unit to carry out instructions of the particular module and wherein the results of instruction are transmitted to the portable electronic device 402 in a wired or wireless fashion. For example, simulation statistics storage 720 may alternatively be located at a remote storage location, such as a network "cloud", wherein a remote server communicates with portable electronic device 402, providing pitch result simulation module 722 recommendation module 724 with the most up-to-date statistics. In one implementation, a person utilizing system 400 may selectively subscribe to one or more different databases, each of the different databases providing simulation statistics for different simulated batters, such as statistics for real-world baseball teams or collections of real-world players. A coach, league or user may make statistics of the user's team, another team, the user's league, another league available for upload or incorporation into system 400 or storage 720. An individual batter's statistics, the statistics of an actual team, or the statistics of a league maybe made available to the user through an app or through other storage medium. The app or storage may be downloaded or made available to the user separate from the ball as a separate download or purchase by the user. Accordingly, the system 400 can be used to assemble a simulated batting line-up or order that matches any desired combination of real players, or simulated players.

Figure 21:
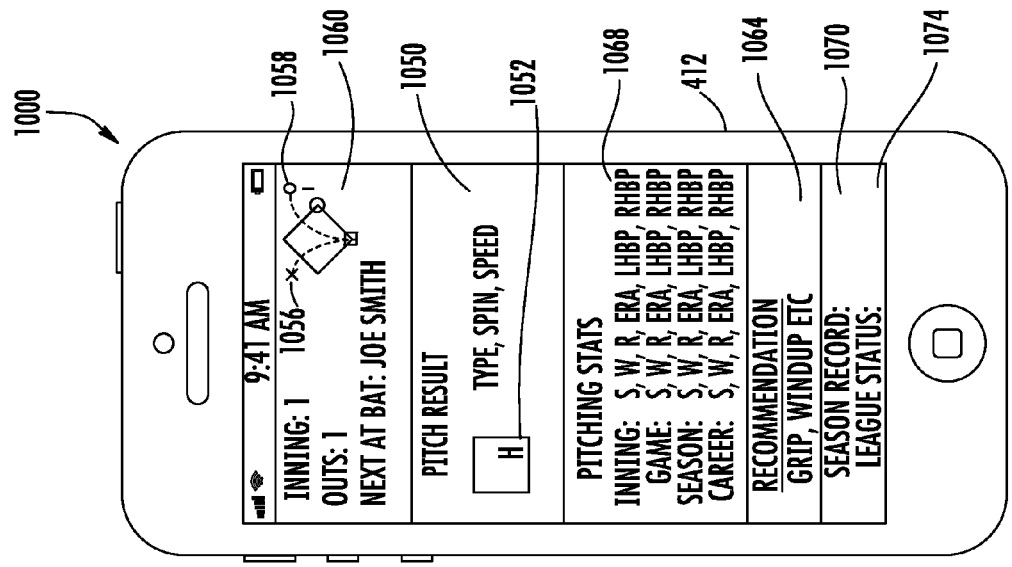
FIGS. 20 and 21 are front views of portable electronic device illustrating an example application of the ball sensing system of FIG. 15.
Figure 20:
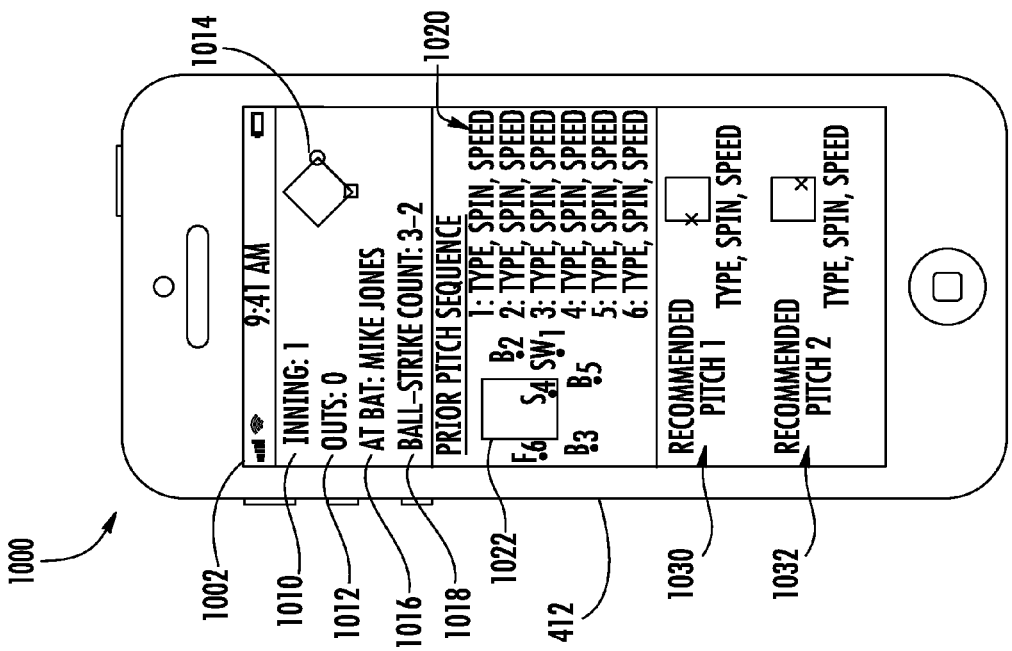

FIGS. 20 and 21 illustrate ball sensing system 1000, a particular implementation of ball sensing system 400. Ball sensing system 1000 is similar to ball sensing system 400 except the ball sensing system 1000 is illustrated as specifically comprising a portable electronic device 1002 in the form of a Wi-Fi enabled device or smart phone. Ball sensing system 1000 comprises similar components to those described above with respect to both sensing system 400 shown in FIGS. 10 and 15. In one implementation, system 1000 may carry out the method set forth in FIG. 12 as well as the method set forth in FIG. 18 or FIG. 19.

FIGS. 20 and 21 illustrate various examples of data or information presented on display 412. As shown by FIG. 21, prior to an upcoming pitch to a particular simulated batter in a simulated lineup in a simulated game, tracking module 726 and output module 434 display the current state of the simulated ballgame. In particular, tracking module 726 and output module 434 display the current inning 1010, the current number of outs in the inning 1012, the current number of base runners and a location of such base runners 1014, and identification of the current simulated batter 1016 and the current ball and strike count 1018 to the simulated batter. In some implementations, additional information may be represented such as the batter's hitting percentage, batting percentages and batting results for different pitch parameters and the like.

In the example illustrated, tracking module 726 and output module 434 additionally illustrate the sequence of prior pitches to the current simulated batter during the current at-bat. In the example illustrated, ball sensing system 1000 is illustrated as displaying each of the prior six pitches, indicating the type of the pitch, the spin of the pitch and the speed of the pitch, identified by reference character 1020, as detected by derivation module 426 and location module 718. Ball sensing system 1000 further illustrates the location of each of the pitches relative to a strike zone 1022 (determined by location module 718) and the simulated pitching results (determined by pitch result simulation module 722 and/or location module 718. In the example illustrated, the first pitch, although outside the strike zone 1022, had a simulated result of a swing strike (SW1). The second pitch resulted in a ball (B2). The third pitch resulted in a ball (B3). The fourth pitch resulted in a called strike (S4). The fifth pitch resulted in a ball (B5). The sixth pitch resulted in a foul ball (F6). As a result, the person pitching may visibly see feedback regarding his or her prior pitches as well as their locations relative to the strike zone and the simulated pitch results.

As further shown by FIG. 20, recommendation module 724 (shown in FIG. 15) retrieves the batting percentages and/or batting results for simulated batter corresponding to different pitch parameters and outputs different recommended pitch characteristics for the upcoming pitch to the simulated player. In the example illustrated, system 1000 is presenting two different recommended pitches: a first recommended pitch 1030 and a second recommended pitch 1032. Recommended pitch 1 comprises a first type of pitch having a first recommended spin, the first recommended speed in a first recommended location. The second alternative recommended pitch comprises a second different type of pitch having a different spin, a different speed in a different recommended location. Much as a pitcher may waive off the recommended pitch from a catcher, system 1000 allows the person pitching to waive off the first recommended pitch and instead attempt a different pitch, such as a second recommended pitch. In other implementations, system 1000 may present a single recommended pitch or more than two recommended pitches. In implementations, the recommended pitch may merely comprise less than all of the example values displayed, such as three or less of the location of the pitch, the type of pitch, the spin of the pitch or the speed of the pitch.

During the actual thrown pitch or throw of ball 420 (or another ball), portable electric device 1000 receive signals from ball 420 and/or the backstop 764 as instructed by communication module 422. Derivation module 426 and location module 718 determine the actual spin and/or type of pitch, the actual velocity of the pitch and the location of the pitch. As shown by FIG. 21, the characteristics 1050 and the result 1052 of the actual thrown pitch are displayed under the instruction of output module 434. In the example illustrated, the type, spin and speed of the actual thrown ball are displayed as well as the location of the thrown ball relative to the strike zone.

The result is indicated as resulting in ball contact as represented by an H. A strike might be represented by an X while a ball might be represented by a displayed B. In other implementations, other representations may be utilized to indicate the pitch result. In one implementation, the result of the pitch may be graphically represented or animated by a representation 1056 or 1058 of the depicted field 1060. In one implementation, the system may interject images, video files or animations following certain pitches. For example, an excerpt of Leslie Nielsen playing the role of an umpire from the movie Naked Gun may be shown momentarily on the screen. In another implementation, an audio file of a celebrity announcer may be produced. For example, an audio clip of Hawk Harrelson saying "grab some bench" may be played upon a third strike. In the example illustrated, the pitch resulted in bat contact with the ball but resulted in a fly ball to left field resulting in an out as represented by X in the field. In the example illustrated, the result of a different pitch resulted in bat contact with the ball which resulted in a single to right field.

In one implementation, the actual pitch result may be overlaid or positioned side-by-side with the recommended pitch, allowing a direct comparison of how close the recommended a pitch was achieved. In one implementation, ball sensing system 1000 compares the recommended pitch to the actual pitch result and based upon the comparison identifies and outputs a recommendation 1064. The recommendation may suggest adjustments to grip, windup or the like. In one implementation, system 1000 stores or is authorized to retrieve one or more tutorial videos or other graphics that may be selected for display on portable electronic device 1002 following a pitch. The system 1000 can also provide statistics or data on how well the user's actual pitches matched the recommended or intended pitch. The statistics can be based upon one or more of pitch characteristics such as, for example, type of pitch, pitch location, speed, and spin. The feedback or analysis can be provided on the basis of a single pitch, a single at-bat, an inning pitched, a multi-inning appearance, a game, and/or a complete season. The feedback or analysis can also be provided in certain game or ball-strike count situations (e.g. runner in scoring position with two outs and two strikes, how accurate was the pitch to the recommended or intended pitch and the like).

After each pitch, tracking module 726 and output module 434 further cooperate to direct processor 414 to display the current simulated game status. In the example illustrated, the last pits resulted in a hit which was a fly out to left field as indicated by graphic 1056. Tracking module 726 updates the current status, indicating that the at-bat team during inning one now has one out. Tracking module 76 further identifies the next simulated batter on deck.

As further shown by FIG. 21, tracking module 726 tracks the pitching results the different at-bats, innings and games. As a result, tracking model 726 and output module 434 cooperates to instruct processor 414 to present various statistics for the user of sensing system 1000. In the example illustrated, the user is provided with statistics 1068 for each inning, game, season and career. That statistics may include strikes, walks, runs, run averages, left hand batter hitting percentages, right-hand batter hitting percentages and the like. In the example illustrated, the user is presented with his or her season record 1070 and his or her ranking or status 1074 relative to a league of other persons using system 1000. In some implementations, the person may be assigned an achievement such as minor-league baseball player, majorly base for player, All-Star or a pitching role such as starter, mid-relief, closer, based upon his or her pitching statistics and/or results.

Once the pitch has been completed, user may toggle back to the display shown in FIG. 20, wherein the prior pitch sequence will be updated or a new simulated batter will be presented. New recommended pitches will be suggested for the new simulated batter taken into account the new simulated batter is different batting characteristics and the different simulated game conditions or circumstances (number of outs in the inning, number base runners and the like). This process is generally repeated for each pitch to each simulated batter.

Figure 22:
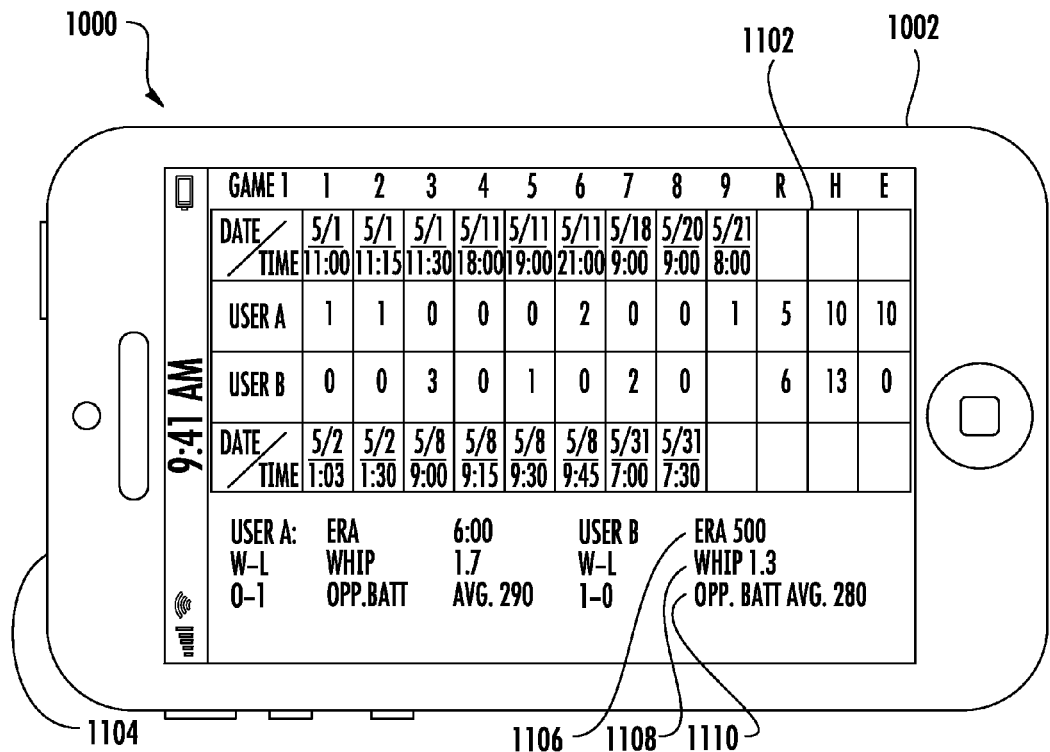
FIG. 22 is a front view of a portable electronic device illustrating another example application of the ball sensing system of FIG. 15.

Referring to FIG. 22, the system 1000 is configured for asynchronous multi-player use. A user can pitch one or more pitches, a full at-bat, an inning, multiple innings, a complete game during one use. Alternatively, the user may complete an entire game or inning over multiple time periods, such as over the course of a day, weekend, or week. The system can store the results of the simulated at-bat or game for as long as desired by the user.

An inning can be defined by a plurality of at-bats against batters of the same team until three outs are obtained. A complete inning would occur when two sets of simulated batters (e.g. a first team and a second team) each have a plurality of at-bats that result in three outs per team. The system can define a game as a plurality of innings or a plurality of complete innings depending upon the desired game by the user or whether one or two users are playing.

Referring to FIG. 22, a front view of a portable electronic device 1002 is shown illustrating one example representation of an asynchronous multi-player simulated ball game by two separate users (User A and User B). The system 1000 is configured to allow multiple players to participate in a single simulated game. User A may face one team, and user B may face a different team. In one implementation, the different simulated teams or batting orders faced by user A and user B may have different performance levels, allowing a handicap to be implemented in the game between user A and user B. For example, in circumstance where user A is much more experienced or skilled at the current time as compared to user B, user A may face a team or group of simulated batters having a higher batting percentage as compared to the team faced by user B, wherein the difference in batting percentages of the two teams faced by users A and B is based upon the difference in skill level between user A and user B. In another implementation, the performance or skill level of the batting order faced by the user is automatically determined and selected based upon a user's past history indicating his or her present skill level. As a result, users of dissimilar skill levels may compete against one another in a challenging competition. Alternatively, user A and user B may both pitch a game against the same batting order.

The system 1000 is configured to communicate with the cloud, the internet, remote electronic device and/or remote server so as to allow two or more users to participate in the same simulated game using the same or different portable electronic devices 1002. The system 1000 allows for the two players to participate in the simulated game at the same time in the same or different locations, or at different times. For example, user A may start the simulated game against user B on Friday afternoon, and user A may pitch two innings. User B may begin his or her participation in the same simulated game on Saturday morning at a separate location using a separate portable electronic device 1002, and pitch three innings. On Tuesday, user B may pitch one additional inning. On Wednesday user A may pitch four innings. This process can continue until both players reach a predetermined number of innings, a predetermined run total, a predetermined run differential or other ball game statistic. The system 1000 also allows for communication between users A and B or others during the course of the asynchronous game, or before or after the game.

In the example shown in FIG. 22, a nine inning simulated baseball game is completed between User A and User B. The game begins on May $1^{st}$ and ends on May $21^{st}$. User A pitches against the simulated batting order of User B's team, and User B pitches against the simulated batting order of User A's team. User A's team and/or User B's team can comprise simulated batters corresponding to and having batting percentages of an actual batting lineup of a major league baseball team, or of another actual baseball team for a particular actual season, such as the most recent season played by the major league baseball team. For example, User A and/or User B may pitch against a batting order comprised of the actual batting line up of the 2013 Chicago White Sox, wherein each simulated batter corresponds to an actual member of the 2013 Chicago White Sox and his associated actual batting statistics. In one implementation, each user may be provided with the option of selecting the actual major league baseball team and season to which each user will pitch. In one implementation, the opponent is provided with the option of selecting the actual major league baseball team and the particular statistical season for the team or statistical aggregate of multiple seasons for the team from which the statistics for the batting order are derived and to which his or her opponent will pitch. In such a manner, the opponent may employ strategy selecting a baseball team (and possibly the season our group of seasons for the baseball team having batting characteristics and statistics which best challenge his or her opponent. For example, a user may select the 1972 Cincinnati Reds (the Big Red Machine) as the batting order to be faced by his or her opponent.

In one implementation, User A's team and/or User B's team can have simulated batters having batting percentages corresponding to real world present or historical individual baseball players of different present or historical teams in the same year or multi-year time from or from different years or multiyear time frames. For example, User A may pitch against a batting order comprised of simulated major league baseball players, selected by user A, selected by his or her opponent User B or automatically selected by system 1000, from multiple different major league baseball teams (similar to a selected All-Star team). The batting statistics utilized for the selected players may be taken from the most recent baseball season or may be taken from more historical seasons or groups of seasons. For example, a user may select to pitch against a simulated batter corresponding to a real-world baseball player, such as a real-world major league baseball player, during a particular stage or time of the real world player's career. For example, in one game, a user may select to pitch against a real-world player in his rookie season and in another game the user may select to pitch against the same real-world player in a different year, such as a year in which the player had his best career season. In one implementation, user may select to pitch against the same real-world player utilizing an aggregate of batting statistics for the real-world player taken from a user selected aggregate of seasons of the real-world player. Alternatively, one or more of the teams can be comprised of simulated batters having batting statistics not corresponding a real world or actual baseball team.

In one implementation, User A and User B can both face the same simulated batting order or line-up. As shown on the box score 1102, User A completed the first three innings on May $1^{st}$, the fourth through sixth innings on May $11^{th}$, the seventh inning on May $18^{th}$, the eighth inning on May $20^{th}$, and the ninth inning on May $21^{st}$. User B completed the first and second innings on May $2^{nd}$, the third through sixth innings on May $8^{th}$, and the seventh and eighth innings on May $21^{st}$. The game ended when User A completed his or her ninth inning having given up more runs than User B, and therefore, User B did not have to pitch a ninth inning. The system 1000 allows for User A and User B to participate in the game on different dates at different times and is configured to upload the game status at any time during the game to the cloud, the internet or other network or server. The game status and/or stats can be displayed on the electronic device 1002 and also on a remote electronic device through the internet, or other communication mechanism. In one implementation, the system 1000 can display a user's Win-Loss record 1104, a user's earned run average (ERA) 1106, a user's total walks and hits per inning pitched (WHIP) 1108, and a user's opponent's batting average 1110. In other implementations, other statistics or game related information can be displayed including standings, number of strikes, pitch count, etc. In other implementations, the game-related information can be displayed in other forms, such as a baseball score card, or an inning by inning update, or other format.

In one implementation, the system 1000 is also configured or programmed to be linked to social networks, or other remote databases so that the user's, other users, friends, league organizers, sponsors, etc., can view the status of the game, a user's win-loss record or position in the standings, etc. The system 1000 can output the game-related statistics to a remote memory for later use. In alternative implementations, User A or User B can complete an entire game by themselves against one batting order where User A pitches a plurality of innings against a single batting order, or against two separate batting orders to finish a plurality of complete innings. In another implementation, all or a portion of the game can be completed by User A and User B at the same time.

In one implementation, system 1000 additionally comprises power ups. A power up is an artificial change to the game to provide the user applying the power up with an extra advantage or boost. Such a power up may be applied by a user during a game or at user selected times during a game. One example of a power up comprises the artificial simulation of wind such as wind blowing in to reduce travel of the a hit ball or a wind blowing out power up to increase travel of a hit ball. For example, a user may spend a "wind blowing in" power up while pitching in the game, whereas the user may spend the "wind blowing out" power up when his or her opponent is pitching. Another example of such a power up may artificially incrementally increase/improve or incrementally decrease/worsen a batting characteristic or statistic of an individual batter or groups of batters. Yet another example power up may artificially incrementally increase/improve or incrementally decrease/worsen characteristics of an actual pitch or group of pitches. For example, a user may spend an example power up which artificially adds 10 mph to the user's actual pitch for an individual pitch, a plurality of pitches to an individual batter, to an individual inning, or in a game or a group of games.

In one implementation, such example power ups may be purchased from a website on the Internet. In one implementation, such example power ups may alternatively be earned as a result of a user meeting certain criteria or thresholds. For example, a user may earn experience points as a user plays and get outs, complete innings or completes games. Such experience points may be utilized as currency on a website, such as an app store, on the Internet to purchase such power ups or other game advancements or options.

In one implementation, specific batting orders, players, teams or the like may be downloaded or purchased from an app store on a website on the Internet. For example, in one implementation, system 1000 may present a user with the opportunity to purchase and download a variety of tournament features, such as the US Little League championship tournament, "Road to Omaha". In some implementations system 1000 may provide the user with the opportunity to upgrade system 1000 by downloading a mini-game or situational game which allows a user to click or select an option (possibly presented as a graphical user interface or icon) where the user is a closer and comes into a simulated game situation, such as coming into a simulated game with a one run lead, bases-loaded, one out or other scenarios. In one implementation, system 1000 allows a user to redo different scenarios, such as different bottom of the ninth inning situations.

Each of the above implementations are usable with a ball having one or more internal sensors, such as ball 20, 220,

320, 420, transmitting signals facilitating determination of characteristics of a pitch. In other implementations, each of the above-described features are alternatively usable in conjunction with balls which do not include internal sensors, wherein other sensing mechanisms are utilized. For example, in other implementations, each of the above-described tracking, feedback and gaming features are alternatively facilitated utilizing backstop 764 with sensors 766 (shown and described above with respect to FIGS. 17A-17C) to sense positioning, travel and/or other characteristics of a pitched ball, wherein the pitched ball does not include sensors and does not transmit signals. In other implementations, video cameras or other devices may be utilized to capture speed, travel and location of a pitch. In yet other implementations, each of the above-describe tracking, feedback and gaming features are alternatively facilitated using user entered inputs indicating the results of actual pitch.

Figure 23:
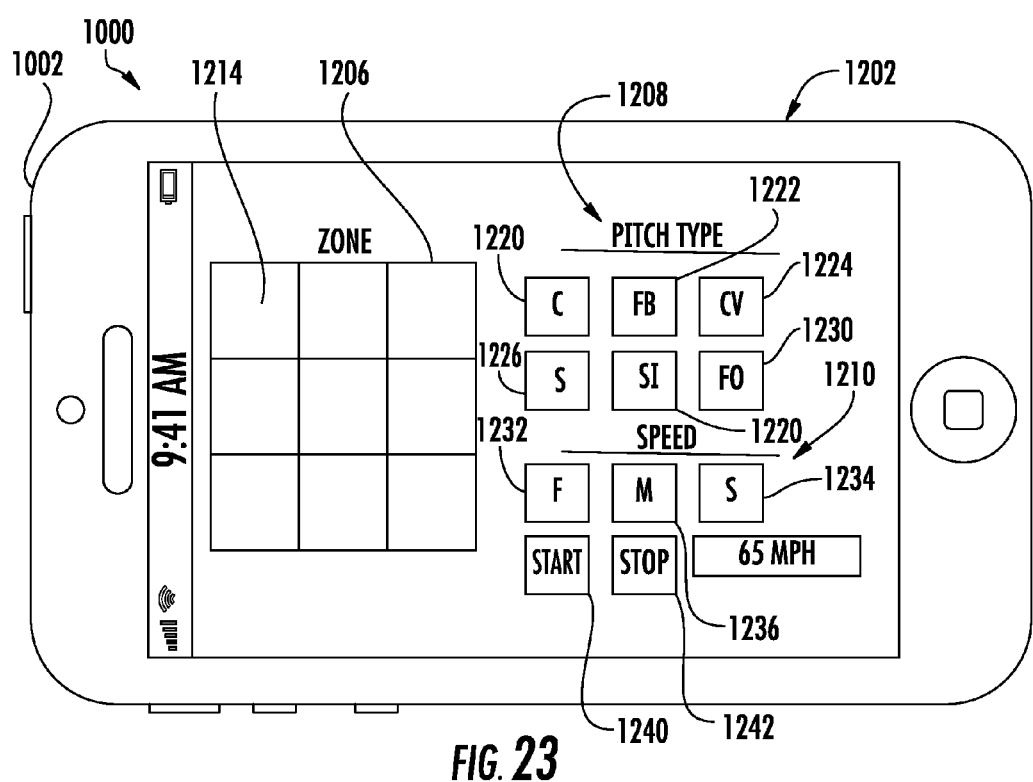
FIG. 23 is a front view of a portable electronic device illustrating an example application of the ball sensing system of FIG. 15.

FIG. 23 illustrates an example mode of operation for system 1000 which facilitates the use of the tracking, feedback and gaming features described above without necessarily utilizing a ball having internal or embedded sensors or a sensing backstop. FIG. 23 illustrates an example Display screen or user interface 1202 presented on portable electronic device 1002. As shown by FIG. 23, interface 1202 comprises a pitch location graphical user interface 1206, a pitch type graphical user interface 1208 and a pitch speed graphical user interface 1210.

Pitch location graphical user interface 1206 facilitates input of a pitch location by user. In the example illustrated, interface 1206 comprises an arrangement of selectable zones 1214 encompassing a strike zone. Such zones are selectable by user to indicate the location of the pitch as it travels across a strike zone or home plate. In one implementation, portable electronic device 1002 may comprise a touch screen, wherein a person may touch one of the particular zones 1214 identifying which particular location of the thrown ball. In another implementation, the particular zone may be selected by moving a cursor or pointer through the manipulation of a mouse, touchpad or the like. In some implementations, the zone may be selected audibly through a microphone and associated speech recognition software. Although nine zones 1214 are illustrated, in other implementations, interface 1206 may include a greater or fewer of such zones.

Pitch type graphical user interface 1208 facilitates input by user of the type of pitch that was thrown. In the example illustrated, user may select from amongst a curveball icon 1220, a fastball icon 1222, a changeup icon 1224, a slider icon 1226, a sinker ball icon 1228 and a forkball icon 1230. In other implementations, a greater or fewer of such types of pitches may be displayed or presented for selection by the user to identify the type of pitch that was thrown. As with the selection of the pitched location, the selection of pitch type any made through use of a touchscreen selection, movement of a selector or pointer or through a microphone with speech recognition software.

Pitch speed graphical user interface 1210 comprises one or more icons selected by user to indicate the speed of the throne pitch. In the example illustrated, user may select from amongst a fast speed icon 1232, a slow speed icon 1234 and a medium speed icon 1236. Such selection may be made using a touchscreen, movement of a cursor or pointer or a microphone with associated speech recognition software. In other implementations a greater or fewer of such differing speed indicators may be presented. In one implementation, user may be prompted to enter or input an estimate of an actual speed or velocity of the pitch.

In some implementations, system 1000 estimates one or more of the pitch location, the pitch type or the pitch speed utilizing signals not originating from sensors within the ball that was thrown or backstop that was struck by the thrown ball. For example, in one implementation, system 1000 receives signals from an independent speed gun brother speed sensing device which indicates the speed of the thrown pitch, wherein the location and pitch type comprise user entered inputs. In another implementation, interface 1202 comprises a start icon 1240 and a stop icon 1242. Depressment or selection of the start icon 1240 initiates a timer while the depressment or selection of the stop icon stops the timer. In one implementation, the user or an observer may be instructed to depress or select the start icon 1240 immediately before the pitching wind up and may be instructed to depress or select the stop icon 1242 after completion of a pitch. In such an implementation, system 1000 may utilize the time that elapsed between actuation of the start icon 1240 and the stop icon 1242, either directly or by comparison with prior pitches, to estimate the relative speed of the thrown pitch.

In some implementations, portable electronic device 1002 comprises internal sensors such as internal accelerometers, gyrometers and the like. In one implementation, the portable electronic device 1002 is configured to be mounted to, or attached to, a particular portion of the pitcher's throwing arm (or other anatomy), wherein signals from the internal accelerometers, gyrometers and other sensors in portable electronic device 1002 are utilized by system 1000 to determine the speed of the thrown pitch. For example, different portions of a person's throwing motion may have characteristic acceleration or other signal patterns. In one implementation, system 1000 analyzes signals received during a pitch to identify signal patterns so as to identify different portions of the pitcher's wind up and throw. Utilizing such identified signal patterns, system 1000 identifies the velocity of the pitcher's arm at the time of ball release and thereby determine or estimate the velocity of the thrown pitch. In such implementations, such signals may further be lively system 1000 to analyze pitching motion and provide feedback and/or recommendations regarding pitching motion. In some implementations, remote sensors may be clipped on or otherwise mounted to portions of the pitcher's anatomy, wherein such remote sensors transmit signals to portable electronic device 1002, in a wired or wireless fashion, and wherein system 1000 determines or estimates one or more of the pitch speed, pitch type or pitch location based upon the timing of such signals, the amplitude of such signals and repeating patterns in such signals.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
receiving signals indicating movement of a physical ball relative to a strike zone during a pitch, the strike zone being positioned at a location that is generally parallel to a front edge of an actual or simulated home base, the received signals indicating at least one of a ball speed, a ball spin and a ball location relative to the strike zone during the pitch when the ball reaches or passes by the strike zone;
retrieving a batting characteristic of a simulated batter corresponding to the indicated movement of the physical ball relative to the strike zone during the pitch, the retrieved batting characteristic of the simulated batter comprising a batting percentage corresponding to the at least one of the ball speed, the ball spin and the ball location;
assigning a simulated pitch result based upon the received signals and the batting characteristic; and
displaying on a computing device the simulated pitch result for the pitch based on the retrieved batting characteristic of the simulated batter for the indicated movement.

2. The method of claim 1, wherein the received signals indicate at least two of a ball speed, a ball spin and a ball location relative to the strike zone during the pitch and wherein the retrieved batting characteristic of the simulated batter comprises a batting percentage corresponding to at least two of the ball speed, the ball spin and the ball location.

3. The method of claim 1, wherein the computing device is further to:
retrieve, prior to the pitch, different batting percentages and different batting results for the simulated batter for different ball speeds, ball spins and/or ball locations; and
output at least one of a recommended pitch speed, pitch location and/or pitch type for the simulated batter based upon the retrieved different batting percentages and different batting results.

4. The method of claim 1, wherein the computing device is further to:
retrieve, prior to the next pitch, different batting percentages and different batting results for the simulated batter for different ball speeds, ball spins and/or ball locations; and
output at least one of a the retrieved different batting percentages and different batting results for the simulated batter.

5. The method of claim 3, wherein the computing device is further to:
track a plurality of simulated pitch results for pitches during a simulated at-bat by the simulated batter, wherein the retrieved batting characteristic comprises a percentage and a batting result that correspond to a ball and strike count for the pitch.

6. The method of claim 4, wherein the computing device is further to:
track a plurality of simulated pitch results for pitches during a simulated at-bat by the simulated batter, wherein the retrieved batting percentage and batting result additionally correspond to a ball and strike count for the pitch.

7. The method of claim 5, wherein the different batting percentages and different batting results retrieved for the simulated batter additionally vary based upon the ball and strike count and wherein the at least one of a recommended pitch speed, pitch location and pitch type for the simulated batter is additionally based upon the ball and strike count prior to the pitch.

8. The method of claim 7, wherein the computing device is further to:
track a sequence of pitches and at least one of the speeds, ball spins and ball locations associated with the sequence of pitches, wherein the simulated pitch result for the pitch is additionally based upon the sequence of pitches preceding the pitch during the simulated at-bat by the simulated batter.

9. The method of claim 8, wherein the at least one of a recommended pitch speed, pitch location and pitch type for the simulated batter is additionally based upon the sequence of pitches preceding the pitch during the simulated at-bat by the simulated batter.

10. The method of claim 9, wherein the computing device is further to recommend a pitch location that is out of the strike zone.

11. The method of claim 5, wherein the computing device is further to:
track a plurality of simulated at-bats for a plurality of simulated batter of a first team having a simulated batting order during a simulated inning of the first team; and
determine and output scoring during the simulated inning by the simulated batters based upon the simulated pitch results during the simulated inning by the simulated batters.

12. The method of claim 11, wherein the computing device is further to:
track a plurality of simulated innings by the first team for a simulated game; and
determine and output scoring during the simulated game based upon the simulated pitch results during the plurality of simulated innings.

13. The method of claim 12, wherein the computing device is further to:
track a plurality of simulated at-bats for a plurality of simulated batters of a second team having a simulated batting order during a simulated inning by the simulated batters of the second team;
track a plurality of simulated complete innings by the first and second teams and track a plurality of simulated complete innings for a simulated game; and
determine and output scoring during the simulated game based upon the simulated pitch results during the plurality of simulated complete innings.

14. The method of claim 13, wherein the computing device is further to allow for the plurality of simulated innings by the first and second teams to be associated with first and second users, respectively.

15. The method of claim 14, wherein the computing device is further to allow the first and second users to complete a plurality of at-bats against the simulated batters of the first and second teams, respectively, at separate times.

16. The method of claim 14, wherein the computing device is further to allow the first and second users to complete at-bats against simulated batters at separate locations.

17. The method of claim 12, wherein the computing device is further to:
track a plurality of simulated games; and
determine and output results for the plurality of simulated games based upon the simulated pitch results during the plurality of simulated innings during each of the plurality of simulated games.

18. The method of claim 13, wherein the computing device is further to:

track a plurality of simulated games; and determine and output results for the plurality of simulated games based upon the simulated pitch results during the plurality of simulated innings during each of the plurality of simulated games.

19. The method of claim 11, wherein the plurality of simulated batters comprise Major-League baseball players.

20. The method of claim 11, wherein the computing device is to prompt a user for selection of the simulated players against whom are to be pitched.

21. The method of claim 11, wherein the computing device is to:

compare the simulated pitching results to a predetermined threshold; and output an achievement notification based upon the comparison.

22. The method of claim 11, wherein the computing device is to determine and output a standard pitching statistic based upon the simulated pitching results.

23. The method of claim 1, when the computing device is to adjust the retrieved batting characteristics of the simulated batter based upon the skill level of the user.

24. The method of claim 1, wherein the physical ball includes:

a core;

at least one layer of yarn surrounding the core;

a cover assembly comprising panels joined by stitching and surrounding the at least one layer of yarn;

a sensor to sense motion of the ball; and a data output device carried by the ball and in communication with the sensor, wherein the data output device transmits the signals to the computing device.

25. The method of claim 1 further comprising steps of impacting a backstop with the physical ball, wherein the backstop includes sensors to output at least one of the signals.

26. The method of claim 1, wherein the received signals indicating movement of the ball originates from at least one sensor positioned within the ball.

27. The method of claim 25, wherein the ball includes at least one sensor to output at least one of the signals.

* * * * *